(12) United States Patent
Abushanab et al.

(10) Patent No.: US 11,209,397 B1
(45) Date of Patent: *Dec. 28, 2021

(54) INSPECTION METHOD FOR ALUMINUM WELD QUALITY

(71) Applicant: King Abdulaziz University, Jeddah (SA)

(72) Inventors: Waheed Sami Abushanab, Jeddah (SA); Essam B. Moustafa, Jeddah (SA)

(73) Assignee: King Abdulaziz University, Jeddah (SA)

(*) Notice: Subject to any disclaimer, the term of this patent is extended or adjusted under 35 U.S.C. 154(b) by 0 days.

This patent is subject to a terminal disclaimer.

(21) Appl. No.: 17/486,279

(22) Filed: Sep. 27, 2021

Related U.S. Application Data

(63) Continuation of application No. 17/363,765, filed on Jun. 30, 2021, now Pat. No. 11,162,918, which is a continuation of application No. 16/411,474, filed on May 14, 2019, now Pat. No. 11,143,624.

(51) Int. Cl.
| | |
|---|---|
| *G01N 29/04* | (2006.01) |
| *G01N 19/08* | (2006.01) |
| *B23K 20/12* | (2006.01) |
| *G01N 29/30* | (2006.01) |
| *G01N 29/12* | (2006.01) |
| *G01N 29/44* | (2006.01) |

(52) U.S. Cl.
CPC ......... *G01N 29/045* (2013.01); *B23K 20/124* (2013.01); *G01N 19/08* (2013.01); *G01N 29/12* (2013.01); *G01N 29/30* (2013.01); *G01N 29/4436* (2013.01); *B23K 20/122* (2013.01); *G01N 2291/0234* (2013.01)

(58) Field of Classification Search
CPC ...... G01N 29/045; G01N 19/08; G01N 29/12; G01N 29/30; G01N 29/4436; G01N 2291/0234; B23K 20/124; B23K 20/122
See application file for complete search history.

(56) References Cited

U.S. PATENT DOCUMENTS

| | | |
|---|---|---|
| 2,571,409 A | 10/1951 | Beyers et al. |
| 3,550,434 A | 12/1970 | Garmhausen |
| 4,007,631 A | 2/1977 | Saifi |
| 4,231,259 A * | 11/1980 | Thiruvengadam ..... G01N 29/11 |
| | | 73/584 |
| 4,728,768 A | 3/1988 | Cueman |
| 4,944,185 A | 7/1990 | Clark, Jr. |
| 5,533,399 A | 7/1996 | Gibson |

(Continued)

FOREIGN PATENT DOCUMENTS

JP          6097090 B2       3/2017

*Primary Examiner* — Nathaniel T Woodward
*Assistant Examiner* — Philip L Cotey
(74) *Attorney, Agent, or Firm* — Oblon, McClelland, Maier & Neustadt, L.L.P.

(57) ABSTRACT

A method for determining a quality of a friction stir welded seam is described. The method involves applying an impact to a welded plate and comparing its damping capacity with the damping capacity of a geometrically equivalent defect-free plate. Damping capacities that differ by a small percent difference indicate that the welded plate is also defect-free. This method is particularly advantageous when dealing with small defects, which produce miniscule changes in natural frequency which may not be measureable.

10 Claims, 16 Drawing Sheets

(56) References Cited

U.S. PATENT DOCUMENTS

| | | |
|---|---|---|
| 6,301,967 B1 | 10/2001 | Donskoy |
| 6,811,632 B2 | 11/2004 | Nelson |
| 7,301,123 B2 | 11/2007 | Statnikov |
| 8,430,977 B2 | 4/2013 | Hisada et al. |
| 8,590,766 B2 | 11/2013 | Okauchi |
| 8,763,881 B2 * | 7/2014 | Keshavan ............ B23K 20/122 228/112.1 |
| 9,851,332 B2 | 12/2017 | Yusuf et al. |
| 9,956,644 B2 | 5/2018 | Foerg |
| 10,195,696 B2 | 2/2019 | Weigl |
| 10,596,658 B1 * | 3/2020 | Coffey .................... C22C 38/02 |
| 2002/0144984 A1 | 10/2002 | Mori |
| 2003/0205565 A1 | 11/2003 | Nelson |
| 2004/0225474 A1 | 11/2004 | Goldfine |
| 2005/0242066 A1 | 11/2005 | Statnikov |
| 2010/0038407 A1 * | 2/2010 | Keshavan ............. B23K 20/22 228/112.1 |
| 2010/0232894 A1 | 9/2010 | Burton |
| 2014/0202937 A1 | 7/2014 | Ohtake |
| 2014/0217154 A1 | 8/2014 | Obaditch |
| 2015/0102087 A1 * | 4/2015 | Foerg ................... B23K 20/123 228/102 |
| 2016/0084802 A1 * | 3/2016 | Yusuf ................... G01N 29/045 73/582 |
| 2016/0193689 A1 * | 7/2016 | Sugimoto ............. B23K 20/12 228/114.5 |
| 2017/0080527 A1 | 3/2017 | Weigl |
| 2018/0050419 A1 * | 2/2018 | Das .................... B23K 20/1265 |
| 2019/0271669 A1 | 9/2019 | Suter |
| 2019/0388998 A1 | 12/2019 | Huggett |
| 2020/0125072 A1 | 4/2020 | Yamamoto |

* cited by examiner

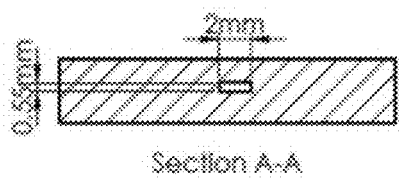
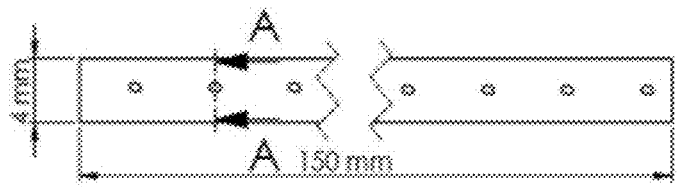
FIG. 12B          FIG. 12A
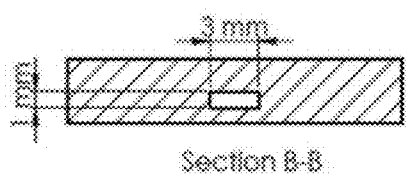
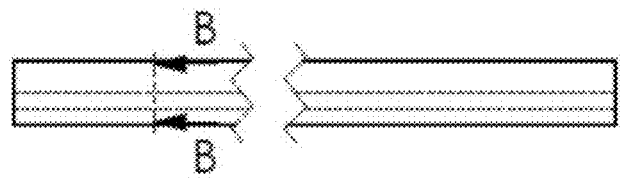
FIG. 12D          FIG. 12C
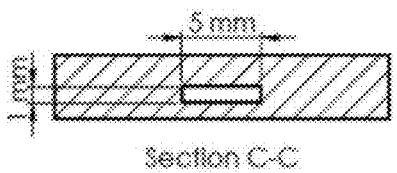
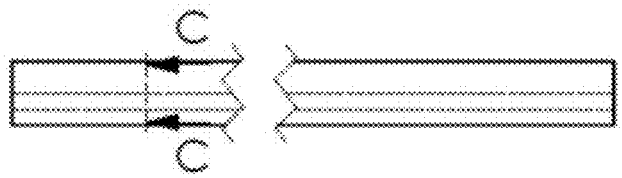
FIG. 12F          FIG. 12E
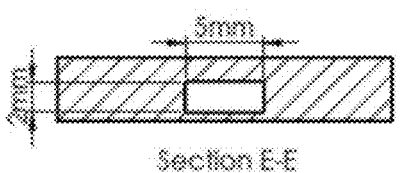
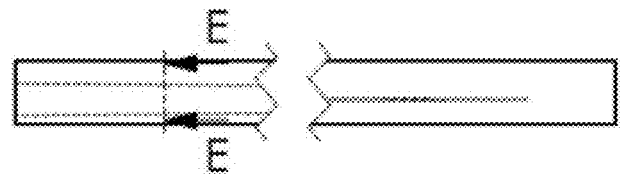
FIG. 12H          FIG. 12G
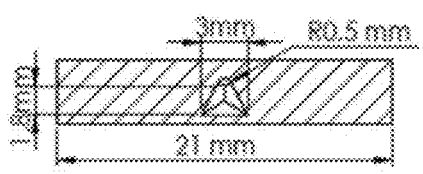
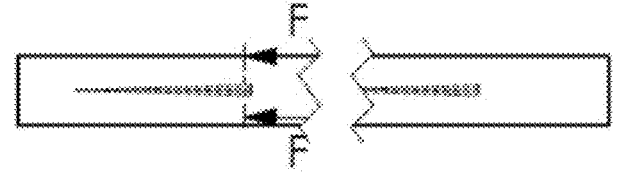
FIG. 12J          FIG. 12I

INSPECTION METHOD FOR ALUMINUM WELD QUALITY

CROSS-REFERENCE TO RELATED APPLICATIONS

The present application is a Continuation of U.S. application Ser. No. 17/363,765, now allowed, having a filing date of Jun. 30, 2021, which is a Continuation of U.S. application Ser. No. 16/411,474, pending, having a filing date of May 14, 2019.

STATEMENT REGARDING PRIOR DISCLOSURES BY THE INVENTORS

Aspects of this technology are described in an article "Detection of Friction Stir Welding Defects of AA1060 Aluminum Alloy Using Specific Damping Capacity" by Waheed Sarni AbuShanab and Essam B. Moustafa, in *Materials* 2018, 11 (12), 2437; doi:10.3390/ma11122437, which is incorporated herein by reference in its entirety.

STATEMENT OF ACKNOWLEDGEMENT

This project was prepared with financial support from the Deanship of Scientific Research (DSR), King Abdulaziz University, Jeddah under grant No. (D-042-980-1440).

BACKGROUND OF THE INVENTION

Technical Field

The present invention relates to a method for determining the presence of defects in a friction stir welded seam.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Friction stir welding (FSW) and processing is an advanced technique used for the joining and fabrication of aluminum alloys. As a result of different processing parameters, such as welding speed and tool shape, discontinuities occur in welded joints, including channel cavities and porosities. Many researchers have studied weld defects and their classification. See Bisadi, H.; Tavakoli, A.; Sangsaraki, M. T.; Sangsaraki, K. T. The influences of rotational and welding speeds on microstructures and mechanical properties of friction stir welded Al5083 and commercially pure copper sheets lap joints. Mater. Des. 2013, 43, 80-88; Esmaeili, A.; Givi, M. K. B.; Rajani, H. R. Z. Investigation of weld defects in dissimilar friction stir welding of aluminium to brass by radiography. Sci. Technol. Weld. Join. 2013, 17, 539-543; Hou, X.; Yang, X.; Cui, L.; Zhou, G. Influences of joint geometry on defects and mechanical properties of friction stir welded AA6061-T4 T-joints. Mater. Des. 2014, 53, 106-117; Kah, P.; Rajan, R.; Martikainen, J.; Suoranta, R. Investigation of weld defects in friction-stir welding and fusion welding of aluminium alloys. Int. J. Mech. Mater. Eng. 2015, 10, 26; Kim, Y. G.; Fujii, H.; Tsumura, T.; Komazaki, T.; Nakata, K. Three defect types in friction stir welding of aluminum die casting alloy. Mater. Sci. Eng. A 2006, 415, 250-254; Ranjan, R.; Khan, A. R.; Parikh, C.; Jain, R.; Mahto, R. P.; Pal, S.; Pal, S. K.; Chakravarty, D. Classification and identification of surface defects in friction stir welding: An image processing approach. J. Manuf. Process. 2016, 22, 237-253; Zhao, Y.; Zhou, L.; Wang, Q.; Yan, K.; Zou, J. Defects and tensile properties of 6013 aluminum alloy T-joints by friction stir welding. Mater. Des. 2014, 57, 146-155; and Essam B Moustafa, S. M.; Tamer, M.; Sayed, A.; El-Sayed, E. Surface composite defects of Al/Al$_2$O$_3$ metal matrix fabricated by Friction stir processing. J. Mater. Sci. Surf. Eng. 2017, 5, 524-527, each incorporated herein by reference in their entirety.

Welding speed is one of the most important processing parameters during the FSW process, and the heat input generated has been reported to have a significant influence on the welding process. See Didžiokas, R.; Januteniene, J.; Jonaityte, J. The impact of the internal welding defects on the joint strength. Transport 2008, 23, 240-244; Chen, J.; Fujii, H.; Sun, Y.; Morisada, Y.; Kondoh, K. Optimization of mechanical properties of fine-grained non-combustive magnesium alloy joint by asymmetrical double-sided friction stir welding. J. Mater. Process. Technol. 2017, 242, 117-125; Kouadri-Henni, A.; Barrallier, L. Mechanical Properties, Microstructure and Crystallographic Texture of Magnesium AZ91-D Alloy Welded by Friction Stir Welding (FSW). Metall. Mater. Trans. A 2014, 45, 4983-4996; Sunil, B. R.; Reddy, G. P.; Mounika, A. S.; Sree, P. N.; Pinneswari, P. R.; Ambica, I.; Babu, R. A.; Amarnadh, P. Joining of AZ31 and AZ91 Mg alloys by friction stir welding. J. Magnes. Alloys 2015, 3, 330-334; and Celik, S.; Cakir, R. Effect of Friction Stir Welding Parameters on the Mechanical and Microstructure Properties of the Al-Cu Butt Joint. Metals 2016, 6, 133, each incorporated herein by reference in their entirety. The quality of FSW depends on the speed of the rotating welding tool as the source of input heat in the process. The formation of tunnels, wormholes, and voids in the welded joint is caused by insufficient heat input and deficiencies in the material flow. See Yajie Li, F. Q.; Liu, C.; Wu, Z. A Review: Effect of Friction Stir Welding on Microstructure and Mechanical Properties of Magnesium Alloys. Metals 2017, 7, 524; Al-Moussawi, M.; Smith, A. J. Defects in Friction Stir Welding of Steel. Metallogr. Microstruct. Anal. 2018, 7, 194-202; and Elangovan, K.; Balasubramanian, V. Influences of pin profile and rotational speed of the tool on the formation of friction stir processing zone in AA2219 aluminium alloy. Mater. Sci. Eng. A 2007, 459, 7-18, each incorporated herein by reference in their entirety.

Internal defects are an important type of defect that are difficult to examine using traditional methods. See Lakshminarayanan, A. K.; Balasubramanian, V. Understanding the parameters controlling friction stir welding of AISI 409M ferritic stainless steel. Met. Mater. Int. 2011, 17, 969-981, incorporated herein by reference in its entirety. Traditional nondestructive test methods, such as ultrasound, radiography, and eddy current, are used to detect welding defects, but they cannot test and inspect all types of materials. Some of these methods are limited to the detection of ferrous metals, and the measurement sensors are sensitive to imperfections in the welded surface. See Vilaça, P.; Santos, T.; Quintino, L. Experimental analysis, defect evaluation and computational developments of FSW. In Proceedings of the IIW South East-European Regional Congress, Timisoara, Romania, 3-5 Jun. 2015; Santos, T.; Vilaça, P.; Quintino, L. Developments in NDT for Detecting Imperfections in Friction Stir Welds in Aluminium Alloys. Weld World 2008, 52, 30-37; and Bebiano, D.; Alfaro, S. C. A weld defects detection system based on a spectrometer. Sensors 2009, 9, 2851-2861, each incorporated herein by reference in its entirety. An automatic identification algorithm was investigated to detect and classify weld defects using radiographic images. See Sikora, R.; Baniukiewicz, P.; Chady, T.; Łopato, P.; Piekarczyk, B.; Psuj, G.; Grzywacz, B.; Misztal, L. Detection and classification of weld defects in industrial radiography with use of advanced AI methods. In Proceedings of the 2013 Far East Forum on Nondestructive Evaluation/Testing: New Technology and Application, Jinan, China, 17-20June 2013, incorporated herein by reference in its entirety. Many studies used vibration and acoustic emissions to identify the dynamic characteristic behavior of materials to predict defects. See Moustafa, E. B. Dynamic Characteristics Study for Surface Composite of AMMNCs Matrix Fabricated by Friction Stir Process. *Materials* 2018, 11, 1240; Gao, L.; Zai, F.; Su, S.; Wang, H.; Chen, P.; Liu, L. Study and application of acoustic emission testing in fault diagnosis of low-speed heavy-duty gears. *Sensors* 2011, 11, 599-611; Droubi, M. G.; Faisal, N. H.; Orr, F.; Steel, J. A.; El-Shaib, M. Acoustic emission method for defect detection and identification in carbon steel welded joints. *J. Constr. Steel Res.* 2017, 134, 28-37; and Sun, L.; Li, Y.; Li, C.; Wang, L.; Wu, J. Active defects detection and localization using acoustic emission method. In Proceedings of the 2010 8th World Congress on Intelligent Control and Automation, Jinan, China, 7-9 Jul. 2010, each incorporated herein by reference in their entirety.

The power spectrum density for the frequency component was used as a good indicator of welding defects. See Allen Jose, A. S. B.; Senthil Kumar, V. S. Analysis of Acoustic Signals in Friction Stir Welding. In Proceedings of the National Conference on Emerging Trends in Computing, Nagpur, India, 16-18 Dec. 2013; pp. 161-164, incorporated herein by reference in its entirety. Online monitoring of the welding process and defects was investigated by Chen et al., using wavelet transform of the acoustic emission signal during friction stir welding to detect the welding defects and weld state. See Chen, C.; Kovacevic, R.; Jandgric, D. Wavelet transform analysis of acoustic emission in monitoring friction stir welding of 6061 aluminum. *Int. J. Mach. Tools Manuf* 2003, 43, 1383-1390, incorporated herein by reference in its entirety. A fractal dimension algorithm was used to extract different acquired signals in order to monitor the welding process and detect the defects due to changes in the signal values. See Das, B.; Pal, S.; Bag, S. Defect Detection in Friction Stir Welding Process Using Signal Information and Fractal Theory. Procedia Eng. 2016, 144, 172-178, incorporated herein by reference in its entirety. Thermography was used as an online monitoring technique in order to evaluate the quality of the welded joints using the FSW process by monitoring the thermal profile during the welding process. See Serio, L. M.; Palumbo, D.; De Filippis, L. A.; Galietti, U.; Ludovico, A. D. Effect of Friction Stir Process Parameters on the Mechanical and Thermal Behavior of 5754-H111 Aluminum Plates. *Materials* 2016, 9, 122; and De Filippis, L. A.; Serio, L. M.; Palumbo, D.; De Finis, R.; Galietti, U. Optimization and Characterization of the Friction Stir Welded Sheets of AA 5754-H111: Monitoring of the Quality of Joints with Thermographic Techniques. *Materials* 2017, 10, 1165, each incorporated herein by reference in their entirety.

A free vibration method was used as a nondestructive test to determine the quality of the welding, which depended on the natural frequencies of the welded samples. See Crâştiu, I.; Nyaguly, E.; Deac, S.; Vodă, M.; Simoiu, D.; Bereteu, L. Defects detection on the welded reinforcing steel with self-shielded wires by vibration tests. *MATEC Web Conf.* 2017, 126, 01007, incorporated herein by reference in its entirety. The authors concluded that higher modes of natural frequencies better indicated the surface welding defects.

Most of the previous investigations concerning the dynamic properties of welding focused on natural frequency, and very small defects were not detected.

In view of the forgoing, one objective of the present invention is to use damping capacity to more accurately detect and identify FSW defects using free vibration analysis. The new detection method depends on the variance in the values of the damping ratio and other dynamic properties.

BRIEF SUMMARY OF THE INVENTION

According to a first aspect, the present disclosure relates to a method for determining a quality of a friction stir welded seam on a welded plate. This involves subjecting a welded plate and a geometrically-equivalent defect-free plate to a physical impact to generate a vibration. Using an accelerometer, a specific damping capacity of the welded plate is measured and compared to that of a defect-free plate. The quality of the welded seam is determined by the similarity between the specific damping capacity of the welded plate and the defect-free plate.

In one embodiment, the method does not compare the natural frequency of the welded plate with the defect-free plate.

In one embodiment, the defect-free plate is not welded.

In one embodiment, the defect-free plate is welded.

In one embodiment, the defect-free plate is friction stir welded.

In one embodiment, the friction stir welded seam is formed with a welding speed in a range of 10-150 mm/min.

In one embodiment, the friction stir welded seam is formed with a rotation speed in a range of 300-2,000 rpm.

In one embodiment, based on the determined uniformity of the friction stir welded seam, the method further comprises welding a second plate with at least one welding parameter that differs from welding parameters used to weld the welded plate when the friction stir welded seam is determined to be non-uniform.

In a further embodiment, the second plate is friction stir welded with a welding speed that differs from the welding speed used to weld the welded plate.

In a further embodiment, the second plate is friction stir welded with a rotation speed that differs from the rotation speed used to weld the welded plate.

In one embodiment, embodiment, the welded plate and the defect-free plate each comprise at least 95 wt % aluminum relative to a respective total weight.

In one embodiment, the welded plate and the defect-free plate each comprise at least 80 wt % iron relative to a respective total weight.

In one embodiment, the accelerometer is removably attached to a top or a bottom of the welded plate or the defect-free plate near a free end.

In one embodiment, the method is non-destructive.

In one embodiment, the friction stir welded seam is considered defective when the specific damping capacity is 30 or greater.

In one embodiment, a natural vibration frequency of the welded plate and of the defect-free plate each differ by no more than 10%.

In one embodiment, a natural vibration frequency of the welded plate and of the defect-free plate each differ by no more than 5%.

In one embodiment, a mass of the welded plate and of the defect-free plate each differ by no more than 0.50%.

In one embodiment, the physical impact is generated by an impact hammer.

According to a second aspect, the present invention relates to a method for predicting the quality of a friction stir welded seam of a welded plate, by calculating a specific damping capacity ($\psi$) of the welded plate according to the formula:

$$\psi = \frac{1}{a + (b \times \omega)}$$

where a is −0.0077, b is $5.9 \times 10^{-5}$, and $\omega$ is the rotation speed in rpm; and where the friction stir welded seam is formed with a constant welding speed in a range of 20-50 mm/min.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 12A is a linear porous FSW defect used for finite element analysis (FEA) simulation.

FIG. 12B is a cross-section of the defect of FIG. 12A.

FIG. 12C is a regular tunnel type B FSW defect used for FEA simulation.

FIG. 12D is a cross-section of the defect of FIG. 12C.

FIG. 12E is a regular tunnel type C FSW defect used for FEA simulation.

FIG. 12F is a cross-section of the defect of FIG. 12E.

FIG. 12G is a taper rectangle tunnel FSW defect used for FEA simulation.

FIG. 12H is a cross-section of the defect of FIG. 12G.

FIG. 12I is an intermittent taper triangle tunnel FSW defect used for FEA simulation.

FIG. 12J is a cross-section of the defect of FIG. 12I.

DETAILED DESCRIPTION OF THE EMBODIMENTS

Figure 1A:
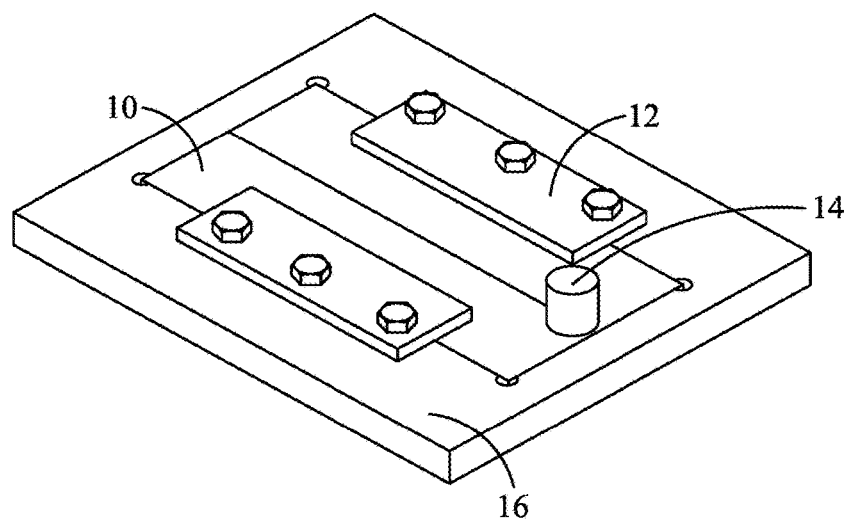
FIG. 1A shows a schematic of a friction stir welding (FSW) process.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}$C and $^{14}$C. Isotopes of nitrogen include $^{14}$N and $^{15}$N. Isotopes of oxygen include $^{16}$O, $^{17}$O, and $^{18}$O. Isotopes of aluminum include $^{26}$Al and $^{27}$Al. Isotopes of iron include $^{54}$Fe, $^{56}$Fe, $^{57}$Fe, $^{58}$Fe, and $^{60}$Fe. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Within the present disclosure, "% difference" when comparing two numerical values refers to the absolute difference between the two values, divided by the average of the two values, all multiplied by 100.

According to a first aspect, the present disclosure relates to a method for determining a quality of a friction stir welded seam on a welded plate. This involves subjecting a welded plate and a geometrically-equivalent defect-free plate to a physical impact to generate a vibration. Using an accelerometer, a specific damping capacity of the welded plate is measured and compared to that of a defect-free plate. The quality of the welded seam is determined by the similarity between the specific damping capacity of the welded plate and the defect-free plate.

The defect-free plate may be welded, and further, the defect-free plate may also be friction stir welded. However, in some embodiments, the defect-free plate is not welded, and is not formed by joining together two plates. In one embodiment the defect-free plate is welded by a different method than friction stir welding, such as arc welding, oxyfuel gas welding, resistance welding, electromagnetic pulse welding, ultrasonic welding, laser welding, electron beam welding, induction welding, electroslag welding, or some other type of welding. Likewise, in an alternative embodiment, the welded plate may be welded by one of these welding processes. Preferably the welding does not involve the use of a filler material.

Friction stir welding (FSW) is a solid-state joining process that uses a non-consumable tool to join two facing workpieces without melting the workpiece material. Heat is generated by friction between the rotating cylindrical tool and the workpiece material, which leads to a softened region near the FSW tool. While the tool is traversed along the joint line, which is usually a butt joint between two clamped workpieces, it mechanically intermixes the two pieces of metal, and forges the hot and softened metal by the mechanical pressure, which is applied by the tool, much like joining clay, or dough. It is primarily used on wrought or extruded aluminum and particularly for structures which need very high weld strength. FSW is also found in modern shipbuilding, trains, and aerospace applications.

Parameters that may affect the weld of the welded plate and/or a weld of the defect-free plate include but are not limited to tool rotation speed, the welding speed (how fast the tool traverses the weld), traverse force, plunge depth, tool shape, tool tilt, force of plunging, speed of plunging, and length of weld. Of these parameters, the two tool speeds to be considered in friction-stir welding include how fast the tool rotates, and how quickly it traverses along the interface. These two parameters have considerable importance and must be chosen with care to ensure a successful and efficient welding cycle. The relationship between the rotation speed, the welding speed, and the heat input during welding is complex, but in general, it can be said that increasing the rotation speed or decreasing the traverse speed will result in a hotter weld. In order to produce a successful weld, it is necessary that the material surrounding the tool is hot enough to enable the extensive plastic flow required to reduce the forces acting on the tool. If the material is too cold, then voids or other flaws may be present in the stir zone, and in extreme cases the tool may break.

In one embodiment, the friction stir welded seam of the welded plate and/or defect-free plate is formed with a welding speed in a range of 10-150 mm/min, preferably 20-120 mm/min, more preferably 30-115 mm/min, even more preferably 40-100 mm/min. In one embodiment, the welding speed may be 105-115 mm/min, or about 110 mm/min; 30-35 mm/min, or about 32 mm/min; 50-55 mm/min, or about 52 mm/min. As used herein, the term "welding speed," is equivalent to "traverse speed," and refers to the speed of the shaft in a one-dimensional translational motion.

In one embodiment, the tool is moved along the metal joint with a traverse force in the range of 100 to 1000 N, preferably 150 to 800 N, preferably 200 to 700 N, preferably 250 to 600 N, preferably 300 to 550 N, preferably 350 to 500 N, preferably about 400 N. The term "traverse force" as used herein refers to the amount of force exerted to the tool to move the tool along the metal joint. The phrase "moving the tool along the metal joint" refers to a translational motion, wherein a direction of moving the tool is parallel to the metal joint, preferably in one dimension. The phrase "moving the tool along the metal joint" may also refer to a two dimensional translational motion. For example, in one embodiment, the tool is moved along the metal joint, wherein a direction of moving the tool is parallel to the metal joint, however, the penetration depth becomes larger as the tool is moved along the joint (i.e. two dimensional translational motion in x and z directions).

In one embodiment, the friction stir welded seam of the welded plate and/or defect-free plate is formed with a rotation speed or rotation rate of the tool in a range of 300-2,000 rpm, preferably 500-1,700 rpm, preferably 600-1,500 rpm, more preferably 800-1,300 rpm, even more preferably 900-1,200 rpm. In one embodiment, the rotation speed may be 900-1,100 rpm, or about 1,000 rpm; 1,100-1,300 rpm, or about 1,200 rpm.

The plunge depth is defined as the depth of the lowest point of the shoulder below the surface of the welded plate and/or defect-free plate and has been found to be an important parameter for ensuring weld quality. Plunging the shoulder below the plate surface increases the pressure below the tool and helps ensure adequate forging of the material at the rear of the tool. The plunge depth needs to be correctly set, both to ensure that the necessary downward pressure is achieved and to ensure that the tool fully penetrates the weld. Given the high loads required, the welding machine may deflect and thus reduce the plunge depth compared to the nominal setting, which may result in flaws in the weld. On the other hand, an excessive plunge depth may result in the pin rubbing on the backing plate surface or creating a significant undermatch of the weld thickness compared to the base material.

Here, the welded plate and/or defect-free plate is formed by friction stir welding that involves plunging the friction stir welding tool into the metal joint to melt at least a portion of metals and to weld the metal joint. The term "plunging the friction stir welding tool into the metal joint" as used herein refers to a process of penetrating the rotating tool into the metal joint to melt at least a portion of the joint and to weld the metal joint. In one embodiment, the tool is plunged into the metal joint with a plunging rate of at least 2 mm/min, preferably at least 3 mm/min, but no more than 5 mm/min. In another preferred embodiment, the tool is plunged into the metal joint with a compressive force in the range of 1 to 20 kN, preferably 1.5 to 10 kN, preferably 2 to 5 kN, preferably 2.5 to 3 kN. In another preferred embodiment, the shaft is plunged into the metal joint to a penetration depth of no more than 3 mm, preferably no more than 2 mm, preferably no more than 1.6 mm.

Tilting the tool by up to 4° from the vertical, such that the rear of the tool is lower than the front, may assist the welding in some embodiments. In one embodiment, the tilt angle may be in a range of 0.5°-4.0°, preferably 1.0°-3.5°, more preferably 1.5-3.0°, even more preferably 1.7°-2.5°, or about 2.0°. However, in alternative embodiments, the tilt angle may be no more than 0.5°, preferably no more than 0.4°, preferably no more than 0.3°, preferably no more than 0.2°, preferably no more than 0.1°.

The tool may have a shoulder diameter in a range of 15-35 mm, preferably 20-30 mm, more preferably 23-28 mm; a pin diameter in a range of 2-10 mm, preferably 4-8 mm, more preferably 5-7 mm; and a length in a range of 2-10 mm, preferably 3-7 mm, more preferably 4-6mm. In one embodiment, the tool may comprise a steel, preferably a high carbon chrome steel such as K110, or some other steel or metal alloy appropriate as a friction stir welding tool.

The length of the weld of the welded plate and/or defect-free plate may be in a range of 5 cm-10 m, preferably 8 cm-8 m, more preferably 10 cm-1 m, even more preferably 12 cm-50 cm, or about 13-17 cm, preferably about 15 cm. In one embodiment, the width of the weld may be between the shoulder diameter and the pin diameter of the tool used to make the weld. In another embodiment, the width of the weld may be 1-20 %, preferably 2-10 % greater than the shoulder diameter.

In one embodiment, a non-oxidizing gas (e.g. argon, nitrogen, and/or helium) is flowed to the welding zone to prevent oxidation of the metal.

Figure 1B:
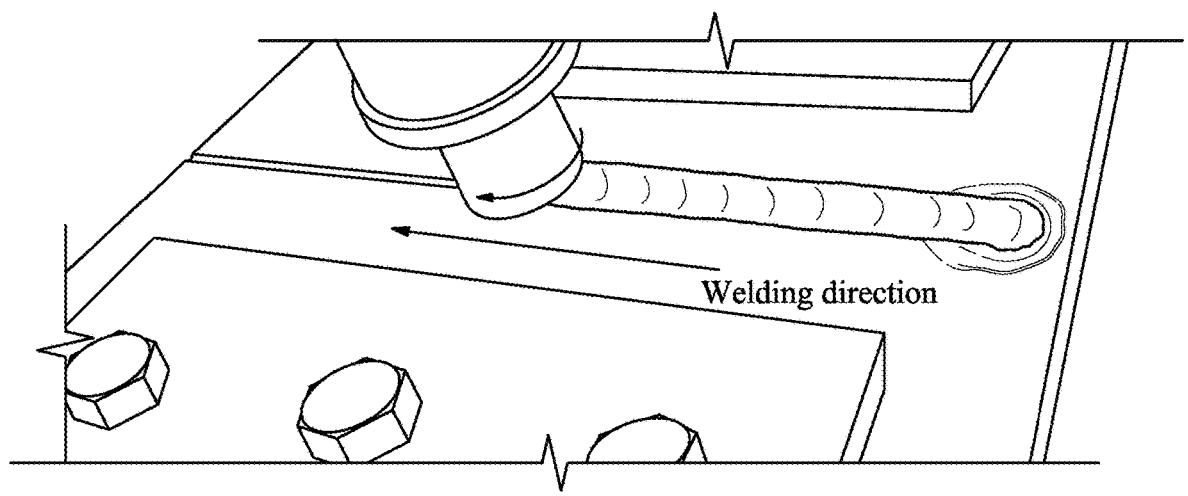
FIG. 1B shows a FSW of an AA1060 aluminum alloy.

In one embodiment, the welded samples are welded with a butt-joint autogenously to form rectangular shaped samples. In one embodiment, the metal joint includes two plates forming a butt joint. In a further embodiment, the metal joint includes two plates positioned side-by-side with their edges touching. An example setup is shown in FIGS. 1A and 1B. Here, the plates 10 are each held by a fixture 12 on a special mounting 16. The tool 14 traverses along the joint, creating a weld by friction stir welding. In other embodiments, other types of joints may be welded, such as lap joints, corner joints, edge joints, and T-joints.

In terms of the present invention, the welded and defect-free plates are square-like or rectangular in shape. In one embodiment, the plates may have a length in a range of 150-500 mm, preferably 200-400 mm, more preferably 225-275 mm; a width in a range of 40-100 mm, preferably 50-80 mm, more preferably 55-75 mm; and a thickness in a range of 2-10 mm, preferably 4-8 mm, more preferably 5-7 mm. In one embodiment, the welded and defect-free plates may be, but are not limited to circular, oval, or triangular shapes.

In one embodiment, the plates of the welded plate and defect-free plate may comprise at least 95 wt %, preferably at least 97 wt %, more preferably at least 98 wt %, even more preferably at least 99 wt % aluminum relative to a total weight of the plates. In one embodiment, the plates may comprise other elements, including but not limited to Si, Fe, Cu, Mn, Mg, V, Ti, and Zn. In one embodiment, the plates may comprise 0.20-0.30 wt %, or about 0.25 wt % Si; 0.3-0.5 wt %, or about 0.4 wt % Fe; 0.02-0.07 wt % or about 0.05 wt % Cu; 0.02-0.07 wt % or about 0.05 wt % Mn; 0.02-0.07 wt % or about 0.05 wt % V; 0.01-0.05 wt % or about 0.03 wt % Ti; and/or 0.02-0.07 wt % or about 0.05 wt % Zn. In one embodiment, the plates may comprise or consist of aluminum alloy 1060 (AA1060). In other embodiments, the plates may comprise or consist of an aluminum alloy such as 1050, 1100, 1199, 2014, 2024, 2099, 2195, 2196, 2198, 2219, 2319, 2519, 3003, 3004, 3102, 4041, 4043, 5005, 5052, 5059, 5083, 5086, 5154, 5356, 5454, 5456, 5754, 6005, 6005A, 6060, 6061, 6063, 6066, 6070, 6082, 6105, 6111, 6162, 6262, 6351, 6463, 7005, 7020, 7022, 7039, 7046, 7050, 7068, 7072, 7075, 7079, 7116, 7129, 7140, 7150, 7178, 8000,or 8090.

In one embodiment, the plates of the welded plate or defect-free plate may comprise at least 80 wt %, preferably at least 85 wt %, more preferably at least 90 wt % iron relative to a total weight of the plates. In another embodiment, the plates may comprise steel. The term "steel" as used herein refers to an iron-carbon alloy, which may also contain Si and/or Cr, and is described as mild-, medium-, or high-carbon steels according to the percentage of carbon present in the alloy. Exemplary steels may include, but are not limited to carbon steel, Damascus steel, stainless steel, austenitic stainless steel, ferritic stainless steel, martensitic stainless steel, surgical stainless steel, tool steel, high strength low alloy (HSLA) steel, advanced high strength steels, ferrous super-alloys, and cast iron. In a preferred embodiment, the steel plate is one selected from the group consisting of ASTM A516 Grade 70 carbon steel, AISI 304 austenitic stainless steel, Ferritic Utility grade Stainless steel DIN 1.4003, and ASTM A240 Grade UNS S41003. Accordingly, the steel plate may have a thickness of 2 to 50 mm, preferably 3 to 40 mm, preferably 5 to 30 mm. In an alternative embodiment, the plates are some other high strength metal or metal alloy, e.g. a titanium plate or a titanium-alloy plate. In other embodiments, the plates comprise some other metal, such as copper, or some other non-metal material, such as a thermoplastic.

Welding is a fabrication or sculptural process that joins materials or joins the same material together, by causing coalescence. This is often done by melting the workpieces and forming a pool of molten material that cools to become a strong joint, with pressure sometimes used in conjunction with heat, or by itself, to produce the weld. After welding, a number of distinct regions can be identified in the weld area. The weld itself is called the fusion zone. This zone may also be referred to as the weld bead. It is surrounded by the heat-affected zone, the area that had its microstructure and properties altered by the weld, but is not part of the workpiece fusion. These properties depend on the base material's behavior when subjected to heat. The metal in the heat affected zone is often weaker than both the base material and the fusion zone, and is also where residual stresses are commonly found. Outside of the heat affected zone is the base material, which is unaltered from the welding process. Excessively high heat input during the FSW may be detrimental to the final properties of the weld. Theoretically, this could result in defects due to the liquation of low-melting-point phases (similar to liquation cracking in fusion welds).

The friction stir welding process, as with any welding process, induces defects and residual stresses in the welded region and structure respectively. The presence of defects developed in a component changes its flexural characteristics, such as the specific damping capacity, as a result of changing the material properties of the structure during welding. In this invention, the amount of vibration damping is compared with a welded plate and a defect-free plate to determine the viability and quality of the weld on the welded plate. When subjected to a physical impact, every material exhibits natural flexural characteristics (e.g. stiffness, damping, and natural vibrational frequency).

As mentioned previously, the method involves subjecting a welded plate and a geometrically-equivalent defect-free plate to a physical impact to generate a vibration. As used herein, the term "geometrically-equivalent" means that the welded plate and the defect-free plate do not differ by more than 10%, preferably 5%, more preferably 3%, even more preferably 1% in any single dimension, which includes length, width, and depth, measured at any location within the shape of the plates. Preferably, the defect-free plate is chemically similar to the welded plate, i.e., they comprise the same metals. Similarly, in one embodiment, the entire method of determining a quality of a friction stir welded seam is non-destructive. In other words, the method does not change the physical or chemical characteristics of the welded plate and of the defect-free plate.

Figure 3A:
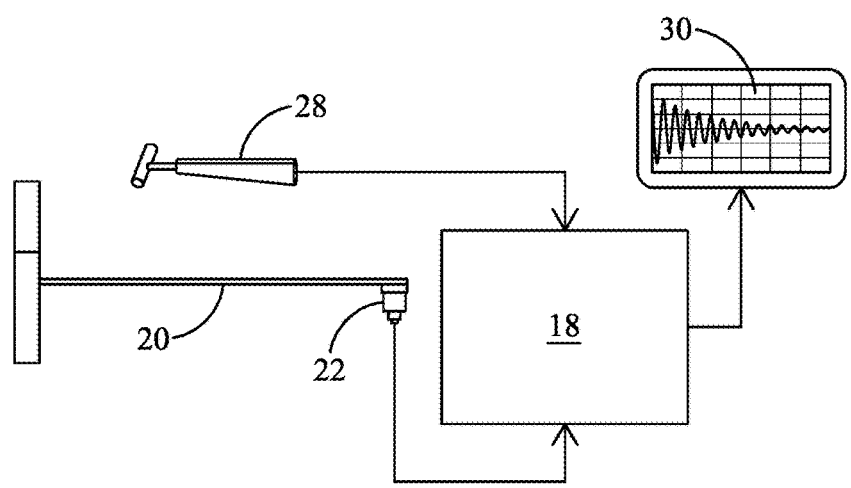
FIG. 3A shows the vibration apparatus and free vibration test setup.

In one embodiment, the plate 20 is secured at one end to a special clamp 24. Having a free end, the plate in this position is a cantilever beam. A cantilever is a beam anchored at only one end. The beam carries the load to the support where it is forced against by a moment and shear stress. Cantilever construction allows for overhanging structures without external bracing. Preferably the weld or welding direction 26 is along the length of the plate as shown in FIG. 3C, and more preferably, the direction of the weld is towards the clamped end. The physical impact is generated by an impact hammer 28. In the present invention, the oscillations of the welded and defect-free plates are measured with an accelerometer 22. An accelerometer is a device that measures proper acceleration ("g-force"), and may therefore be used to detect and measure vibration as a change in proper acceleration. As shown in FIG. 3A, the accelerometer, and optionally, the impact hammer, is in communication with a pulse analyzer module 18, which records the transient response 30 of the plate's oscillations.

Figure 3B:
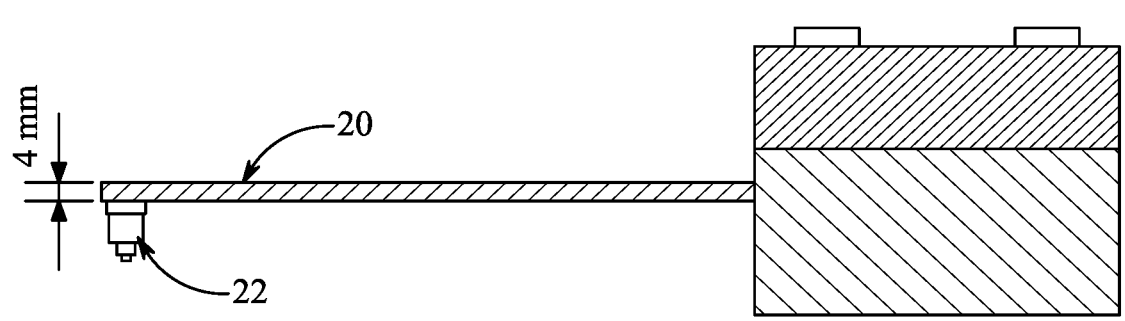
FIG. 3B is a side view of the cantilever beam.
Figure 3C:
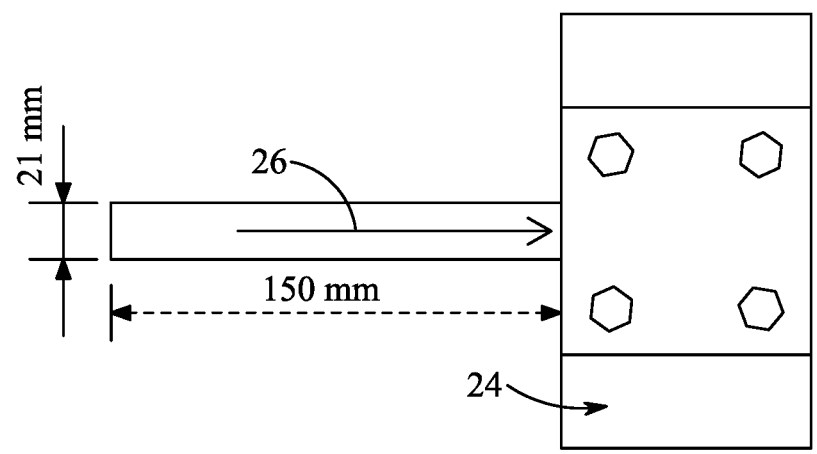
FIG. 3C is a top view of the cantilever beam.

FIGS. 3B and 3C show side and top views of a plate 20 with an accelerometer 22, with the plate having one end fixed to a special clamp 24. In one embodiment, in terms of the fixed end being 0% and the total length of the welded plate from the fixed end being 100%, the accelerometer is located 60-100%, preferably 70-100%, more preferably 80-100%, even more preferably 90-100% of the length of the welded or defect-free plate.

In one embodiment, before being fixed into the special clamp 24, the welded and defect-free plates may be cut into smaller sizes. Where the plates are cut, both welded and defect-free plates are cut to remain geometrically equivalent with one another. In some embodiments, the surfaces may be slightly machined to remove certain irregularities without removing surface defects. The plates may be cut to a length in a range of 150-250 mm, preferably 170-220 mm, or about 200 mm; a width in a range of 15-70 mm, preferably 17-40 mm, more preferably 18-22 mm; and a thickness in a range 2-7 mm, preferably 3-6 mm, or about 4 mm. Preferably, when fixed, the length of the cantilever is in a range of 120-190 mm, preferably 130-170 mm, more preferably 140-160 mm, or about 150 mm.

In one embodiment, in terms of the fixed end being 0% and the total length of the welded or defect-free plate from the fixed end being 100%, the weld is located 20-80%, preferably 30-70%, more preferably 40-60% of the length of the welded or defect-free plate. In one embodiment, the accelerometer is removably attached to a top or a bottom of the welded plate or the defect-free plate near a free end, or 70-100%, preferably 75-99.5%, more preferably 85-99% of the length of the welded or defect-free plate. In one embodiment, the accelerometer is removably attached by clips or an adhesive. In another embodiment, the accelerometer is attached to both top and bottom, for instance, by clamping around an edge of the plate. In one embodiment, the accelerometer is located on, and rests upon the top side of the welded or defect-free plate.

In one embodiment, the physical impact is imparted on the welded or defect-free plate at a distance ranging from greater than x to less than L, wherein x is a distance of the weld from the fixed end, and L is a total length of the welded plate from the fixed end.

In one embodiment, the physical impact is generated from the top of the welded or defect-free plate, and on an opposite side to the accelerometer. In an alternative embodiment, the physical impact is generated from the bottom of the welded or defect-free plate, on the same side as the accelerometer. In one embodiment, the physical impact is applied to a side of the welded plate or the defect-free plate opposite the accelerometer.

Applying a physical impact to a solid system will induce flexural motion and the system will oscillate. Natural frequency is the frequency at which a system tends to oscillate in the absence of any driving or damping force. A common example of such a phenomenon is a tuning fork. A tuning fork is an acoustic resonator in the form of a two-pronged fork with the prongs formed from a U-shaped bar of elastic metal, usually steel. It resonates at a specific constant pitch when set vibrating by striking the prongs against a surface or with an object, and emits a pure musical tone after waiting a moment to allow some high overtones to die out.

The pitch that a particular tuning fork generates depends on the length and mass of the two prongs. It is frequently used as a standard of pitch to tune musical instruments. A tuning fork produces a very pure tone, with most of the vibrational energy at the fundamental frequency, and little at the overtones (harmonics). Therefore, in a plot of vibrational frequency vs amplitude, most of the frequency will be in a tight range, regardless of the physical impact imparted on the tuning fork. In other words, rather than a system producing a single frequency with a single amplitude, the vibrational frequency of the oscillations tend to exhibit a Gaussian-like distribution as a function of amplitude, with most frequency values in a tight range.

Similar to a tuning fork, when welded or defect-free plates are oriented in a cantilever beam configuration and a physical impact is applied, the sample will oscillate, with most of the vibrational energy at the fundamental frequency, irrespective of the force of physical impact. When the empirically determined vibrational frequency is plotted as a function of amplitude, a Gaussian-like distribution is produced, with most of the frequency values in a tight range. In terms of the present invention, the natural vibration frequency refers to the frequency value at the apex of the signal amplitude in a plot of frequency vs amplitude. Alternatively, the natural vibrational frequency values, when used for comparison to another sample, may refer to any point within the frequency curve as a function of amplitude, as long as the comparison value is also selected from the same point of the respective frequency curve of the compared sample. For example, the two frequency values (one with a higher frequency and one with a lower frequency) determined from the amplitude mid-point of a frequency curve from a welded sample may be compared with the two frequency values at the amplitude mid-point of a frequency curve of a non-welded sample.

The natural frequencies of the welded plate and defect-free plate may be in a range of 40-120 Hz, preferably 50-110 Hz. However, in one embodiment, the method for determining a quality of a friction stir welded seam on a welded plate does not involve measuring or determining the natural frequencies of the welded plate and the defect-free plate. In some embodiments, the natural frequencies may be measured or determined, but the method for determining the quality of a friction stir weld does not involve comparing the natural frequency values. In some cases, weld defects may be too small to cause changes in the natural frequencies, in which case a defective welded plate would appear similar to a defect-free plate.

Defects in welds include, but are not limited to, tunnels, pores, linear pores, tapered tunnels, rectangular tunnels, triangular tunnels, and intermittent tunnels. Defects may result from entrapped air or gas. The defects may have a length of 1-150 mm, 20-120 mm, or 25-110 mm. The defects may have a height of 0.2-5 mm, preferably 0.5-4 mm, more preferably 0.7-2 mm, and a width of 1-10 mm, preferably 1.2-6 mm, more preferably 1.5-5 mm. In some embodiments, a weld may have one defect, though preferably where a weld is defective, several defects may be present. Multiple defects, when present, may be spaced intermittently along a length of the weld, with spacing in a range of 0.2-50 mm, preferably 0.5-40 mm, more preferably 1-20 mm. Multiple defects may have similar or different dimensions or shapes. In some embodiments, a defect may be classified as either large or small. For instance, a large defect may have a length that is at least 10 mm, preferably at least 15 mm, or at least 17 mm, where a small defect has a length under those values. A large defect may have a height of at least 2.5 mm, preferably at least 3.0 mm, while a small defect has a smaller height. A large defect may have a width of at least 4 mm, preferably at least 6 mm, while a small defect may have a width below those values. Thus, in some embodiments, the classification of a defect being large or small may be determined by one or more dimensions.

In one embodiment, a natural vibration frequency of the welded plate and of the defect-free plate each differ by no more than 10%, preferably by no more than 7%, preferably by no more than 5%, even more preferably by no more than 2.5%. In one embodiment, the welded plate may have a defect, and a natural vibration frequency of the welded plate and of the defect-free plate each differ by no more than 5%, preferably by no more than 3%, preferably by no more than 2%. In a related embodiment, the welded plate may have a defect, and a natural vibration frequency of the welded plate and of the defect-free plate may be indistinguishable from each other.

In one embodiment, the welded plate and the defect-free plate may have similar natural frequencies because their masses are similar. In one embodiment, a mass of the welded plate and of the defect-free plate each differ by no more than 1.00%, preferably by no more than 0.50%, or 0.45%, or 0.40%, or 0.35%, or 0.30%, or 0.25%, or 0.20%, or 0.15%, or 0.10%, or 0.05%, or 0.01%.

While the welded plate and the defect-free plate may have similar natural frequencies, a defective welded plate may be determined by measuring and comparing specific damping capacities. Damping capacity is the ability of a material to absorb energy by converting mechanical energy into heat, and a welded plate with defects may have a greater damping capacity than a defect-free plate. In one embodiment, a welded plate with defects dampens in a period of time that is 10-70%, preferably 20-60%, more preferably 25-40% of the time needed for a geometrically-equivalent defect-free plate to dampen.

In one embodiment, the specific damping capacity, $\psi$, may be calculated by equations 1 and 3, where n is the number of cycles, $x_o$ is the amplitude of the first cycle, $x_n$ is the amplitude of the last cycle, and $\delta$ is the logarithmic decrease. In one embodiment, the friction stir welded seam of the welded plate is considered defective when the specific damping capacity is 30 or greater, preferably 40 or greater, more preferably 45 or greater. In an alternative embodiment, the friction stir welded seam of the welded plate may be considered defective by measuring the specific damping capacity of only the welded plate and not the defect-free plate.

In one embodiment, an analyzer such as the pulse analyzer module 18 in FIG. 3A, may be used to record the oscillations from the accelerometer and compute a specific damping capacity. In other embodiments, different circuits or computing devices may be used. In another embodiment, a laser may be reflected off a surface of a plate where the vibrations may be captured by a camera or some other photosensitive device without using an accelerometer. In another embodiment, a pen may be attached to a plate with a tip in contact with paper so that it draws the oscillations directly, similar to a seismograph.

In the present invention, the specific damping capacities of the welded plate and of the defect-free plate are compared to determine the quality of the weld on the welded plate. A weld with high quality is considered to be uniform and defect-free or nearly defect-free, while a weld with a low quality is considered to be non-uniform or defective, with one or more defects as mentioned previously.

In one embodiment, the weld of the welded plate is considered defective when the % difference between the specific damping capacity of the welded plate and the defect-free plate is greater than 20%, preferably greater than 17%, more preferably greater than 15%. In one embodiment, the weld of the welded plate is considered to be uniform and defect-free or nearly defect-free when the % difference between the specific damping capacity of the welded plate and the defect-free plate is less than 15%, preferably less than 10%, even more preferably less than 7%. In one embodiment, the two damping capacities may be considered similar when the percent difference is less than 15%, and dissimilar when the two damping capacities have a percent difference of 15% or more.

In one embodiment, the method may be used by one of skill in the art to determine weld quality of a welded sample as a quality control procedure. For instance, it is envisaged that the method of the present invention may be used as a feedback mechanism by which a welder/manufacturer compares the uniformity between a welded sample and a non-welded and/or defect-free sample, then if a welded sample is deemed non-uniform, defective, or low quality, the welding process is repeated with differing welding parameters (e.g. welding speed, rotation speed, etc.) until the welded sample is deemed uniform or of high quality with respect to the non-welded and/or defect-free sample.

In one embodiment, where a weld is determined to be defective, the plates may be discarded and a second plate or second set of plates may be used for the welding with a different welding parameter. In another embodiment, rather than replacing both plates, only one of the two plates or workpieces may be replaced. In another embodiment, a welding process may be carried out on the defective welded seam, in order to reform the seam and remove defects, and this welding process may be friction stir welding or some other type of welding as previously discussed. In one embodiment, a defective welded seam may be cut open before re-welding. In a further embodiment, a defective welded seam that is cut open for re-welding may or may not use a filler material. In a further embodiment, where a filler material is used, the filler material may have the same chemical composition of the plate or plates being welded. In another embodiment, a weld may be partly removed, for instance, by sanding, polishing, chemical etching, or other surface treatments. In related embodiments, a weld that is replaced, partly or completely removed, or re-welded is subjected to the method of measuring the specific damping capacity.

In another embodiment, the method may be used to determine friction stir welding parameters to use on a certain type and thickness of metal workpieces. The method may be used on sample pieces of the metal, and then the welding parameters that produce defect-free welds may be used for welding larger workpieces with the idea that those workpieces will also have defect-free welds. In a related embodiment, the method may be adapted to measuring specific damping capacities over a range of welding parameters in order to produce a calibration curve. The calibration curve may then be used to select one or more appropriate welding parameters for producing defect-free welds.

According to a second aspect, the present invention relates to a method for predicting the quality of a friction stir welded seam of a welded plate, by calculating a specific damping capacity ($\psi$) of the welded plate according to the formula:

$$\psi = \frac{1}{a + (b \times \omega)}$$

where a is −0.0077, b is $5.9 \times 10^{-5}$, and $\omega$ is the rotation speed in rpm; and where the friction stir welded seam is formed with a constant welding speed in a range of 20-50 mm/min, preferably 25-45 mm/min, more preferably 28-40 mm/min, even more preferably 30-35 mm/min, or about 32 mm/min. Preferably the welded plate comprises an aluminum alloy as previously discussed, preferably AA1060. In one embodiment, the accuracy in terms of the coefficient of determination of the calculating is 90-99.9%, preferably 93-99.9%, more preferably 95-99.9%. In one embodiment, the calculating does not differ from the specific damping capacity (measured by the accelerometer as described previously) by more than 20%, preferably 15%, more preferably 12%.

The examples below are intended to further illustrate protocols for detecting friction stir welding defects using specific damping capacities, and are not intended to limit the scope of the claims.

EXAMPLE 1

Experimental Procedure

Figure 2:
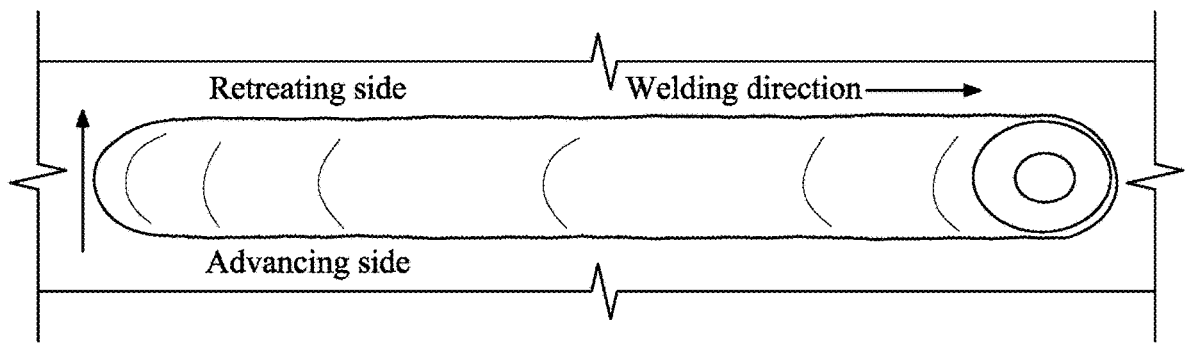
FIG. 2 illustrates welded plates after FSW process.

Aluminum alloy AA1060 plates were used as the base metal. The chemical composition of this commercial alloy is presented in Table 1. It is widely used in special tanks and chemical industries on account of its corrosion resistance. Moreover, as it has high thermal and electrical conductivity, it is commonly used in electrical applications. The specimens were cut into rectangular shapes 250 mm long, 60 mm wide, and 6 mm thick. A high carbon-chrome steel (K110) tool with a shoulder diameter of 25 mm, pin diameter of 6 mm, and length of 5 mm, was used for the welding process. The process was performed at different rotation and traverse speeds, with five tool rotation speeds being chosen (600, 1000, 1200, 1500, and 1800 rpm). Each rotation speed was applied with four different welding speeds (16, 32, 52, and 110 mm/min). The tool was used with a tilt angle of 2 degrees. An automatic milling machine (Bridgeport, Elmira, N.Y., USA) was used to perform the friction stir welding process, as shown in FIG. 1. After performing the welding process, the samples were slightly machined on the surface of the welded joint in order to remove the flashes and other irregularities generated during the FSW process, taking care to not remove any surface defects. Most of the generated defects formed inside the welded joint and did not appear visually in most of the welded samples, as shown in FIG. 2. After that, we cut the joints longitudinally in the middle of the welding position to create 21 mm wide specimens. The specimens (200 mm×21×mm×4 mm) were prepared for the vibration test and radiography inspection. The samples were polished and etched in the cross-section of the friction stir welding joint, using classic Keller's reagent (2 mL HF (48%)+5 mL $HNO_3$+3 mL HCL+190 mL distilled water) for the macroscopic examination.

EXAMPLE 2

Free Vibration Impact Test

Samples were prepared as a cantilever beam with one free end and fixed using a special clamp. The net fixed dimensions of the tested cantilever beam were 150 mm long, 21 mm wide, and 4 mm thick. The vibration signal was acquired using a piezoelectric CCLD accelerometer. The accelerometer was mounted using plastic clips. An impact hammer with a force transducer was used to excite the welded joint. Vibration analysis was performed using a LAN-XI (3050 A-60 Bruel&Kjaer, Nærum, Denmark). The data acquisition system was a 6-channel input module, with a frequency range of (0-51 KHz), FFT resolution up to 6400 lines. FIG. 3 shows the apparatus used in the investigation. The specific damping ratio, natural frequency, and frequency response function were analyzed using post-processing software ME'Scope (Vibrant Technology, Centennial, Colo., USA) and verified using theoretical methods. The test was repeated 10 times for each sample in order to attain the optimum value through average readings.

EXAMPLE 3

Results and Discussions

The main purpose of this investigation was to predict FSW defects using the dynamic properties of a welded joint. The vibration analysis was calculated and analyzed using commercial vibration analysis software (Pulse Labshop and ME'Scope). Empirical and theoretical equations were used to verify the estimated dynamic properties, such as the damping ratio and natural fundamental frequency. The damping capacity refers to the ability of a material to absorb energy. Materials with a high damping capacity often indicate weakness in the material, and from this principle, it is possible to predict the welding defects. See Schaller, R. Metal matrix composites, a smart choice for high damping materials. *J. Alloys Compd.* 2003, 355, 131-135, incorporated herein by reference in its entirety.

EXAMPLE 4

Free Vibration Analysis

In this method, which is also called the damped free vibration method, the specimen freely vibrates at its natural frequency, and is damped only by the internal friction of the material. The amplitudes of successive cycles are determined and used to calculate the logarithmic decrease according to Equation (1). The logarithmic decrease is one of the most common methods used to express the damping capacity, as presented in Equations (1)-(3). The logarithmic decrease represents the rate at which the amplitude of a free damped vibration decreases. See Rao, S. S. *Mechanical Vibration*, 5th ed.; Lake Street, Prentice Hall: Upper Saddle River, N.J., USA, 2011; p. 1105; Botelho, E. C.; Silva, R. A.; Pardini, L. C.; Rezende, M. C. A Review on the Development and Properties of Continuous Fiber/epoxy/aluminum Hybrid Composites for Aircraft Structures. *Mater. Res.* 2006, 9, 247-256; and Moini, S.; Miles, J. A.; Chen, P. Physical Properties of Ponderosa Pine Tree. *Trans. ASAE* 1981, 24, 1058-1061,each incorporated herein by reference in their entirety. Thus, the logarithmic decrease δ is obtained as:

$$\delta = \frac{1}{n} \ln \frac{x_o}{x_n} \quad (1)$$

$$\zeta = \sqrt{\frac{\delta^2}{\delta^2 + 4\pi^2}} \quad (2)$$

where $x_o$, $x_n$, and n are the amplitudes of the first and last cycles, and number of cycles, respectively. The damping ratio is calculated using Equation (2), where ζ is the damping ratio.

$$\text{Specific damping Capacity } (\psi) = 2\delta \quad (3)$$

Figure 4A:
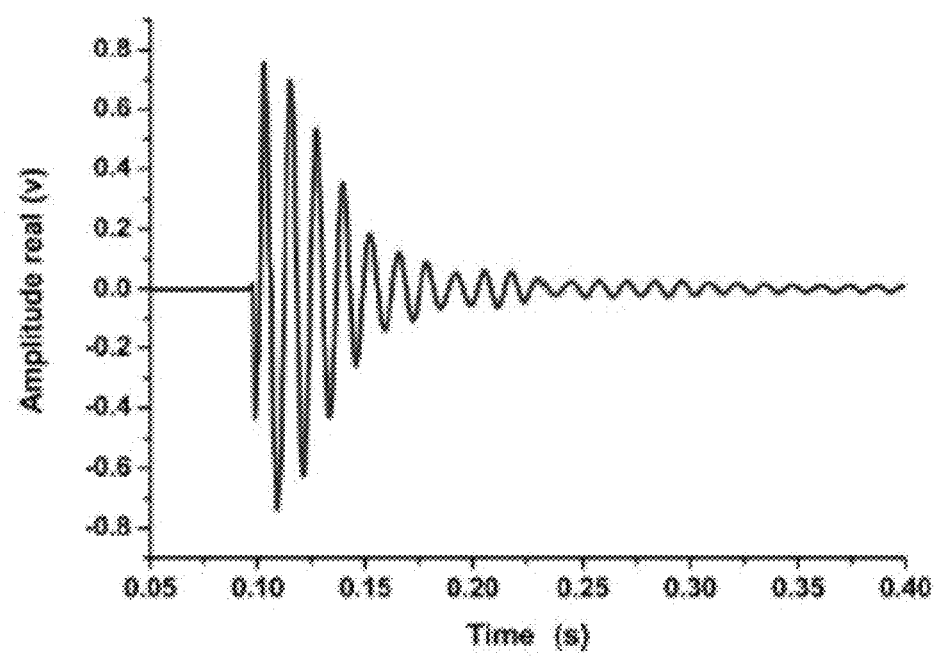
FIG. 4A is a transient response from the free vibration impact test of a sample welded with a rotation speed of 600 rpm and a welding speed of 16 mm/min.
Figure 4B:
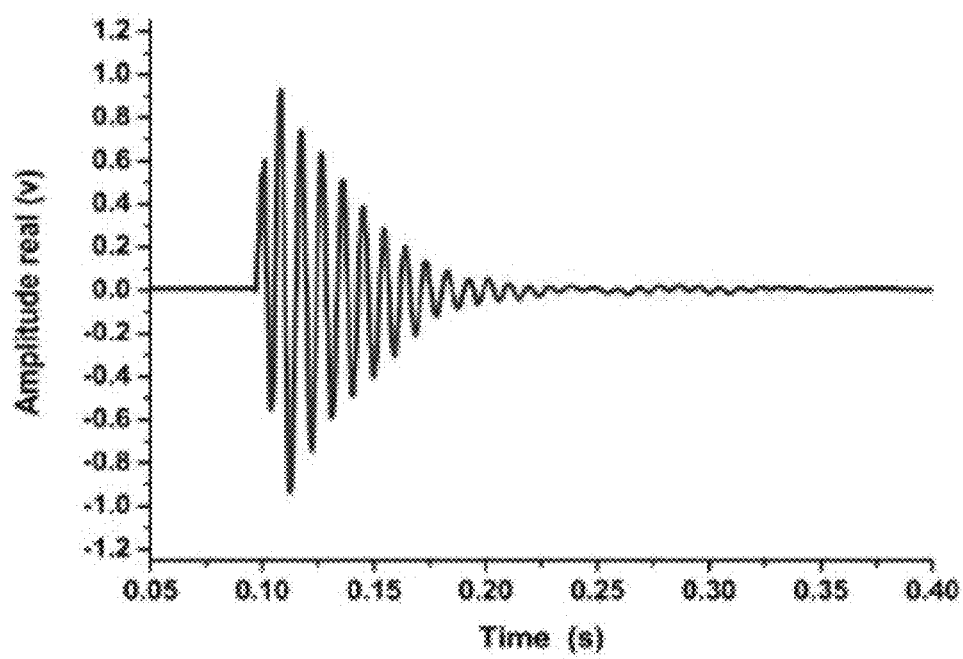
FIG. 4B is a transient response from the free vibration impact test of a sample welded with a rotation speed of 1500 rpm with a welding speed of 52 mm/min.
Figure 4C:
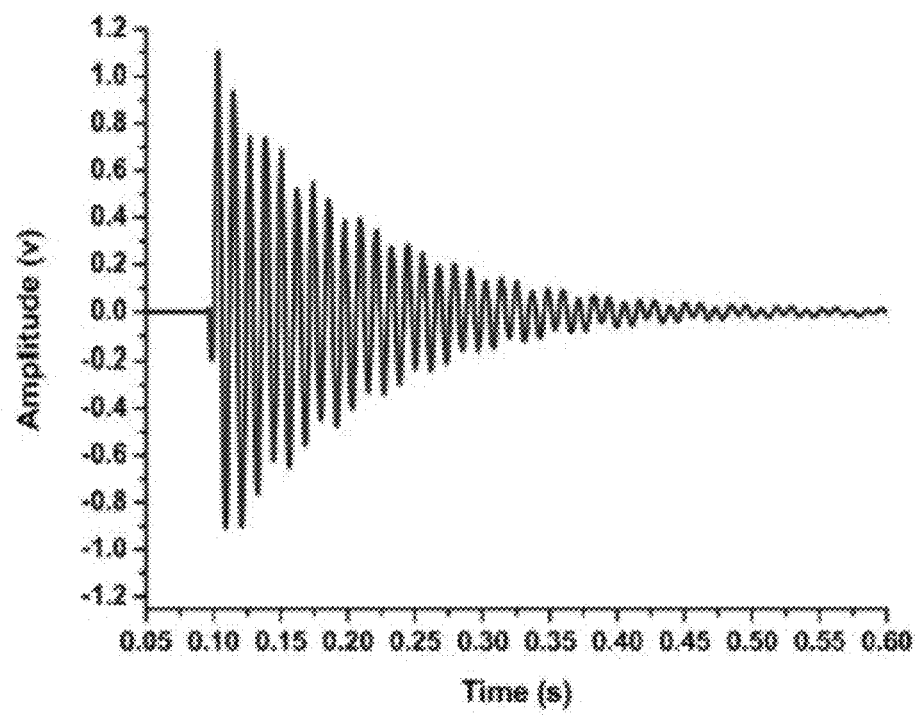
FIG. 4C is a transient response from the free vibration impact test of a sample welded with a rotation speed of 1500 rpm with a welding speed of 110 mm/min.
Figure 4D:
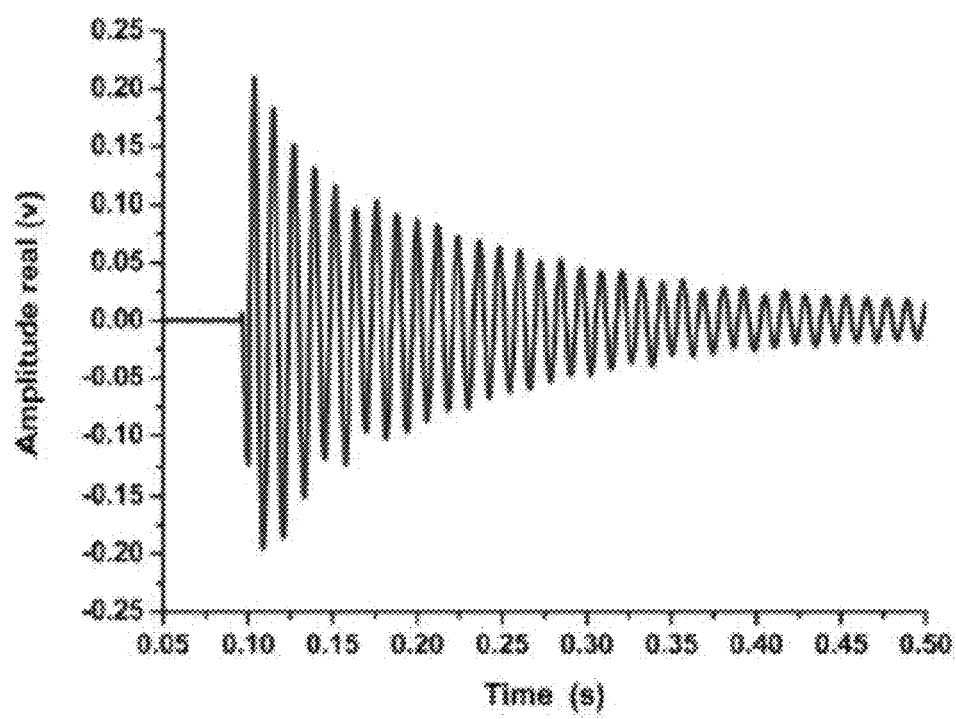
FIG. 4D is a transient response from the free vibration impact test of a sample welded with a rotation speed of 600 rpm with a welding speed of 110 mm/min.
Figure 4E:
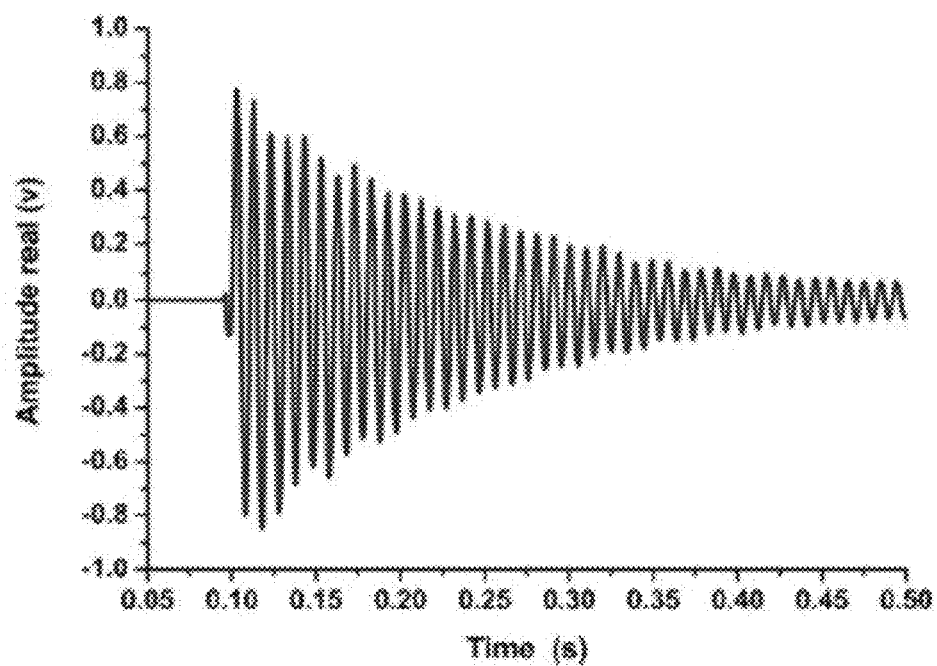
FIG. 4E is a transient response from the free vibration impact test of a sample welded with a rotation speed of 1200 rpm with a welding speed of 32 mm/min.
Figure 4F:
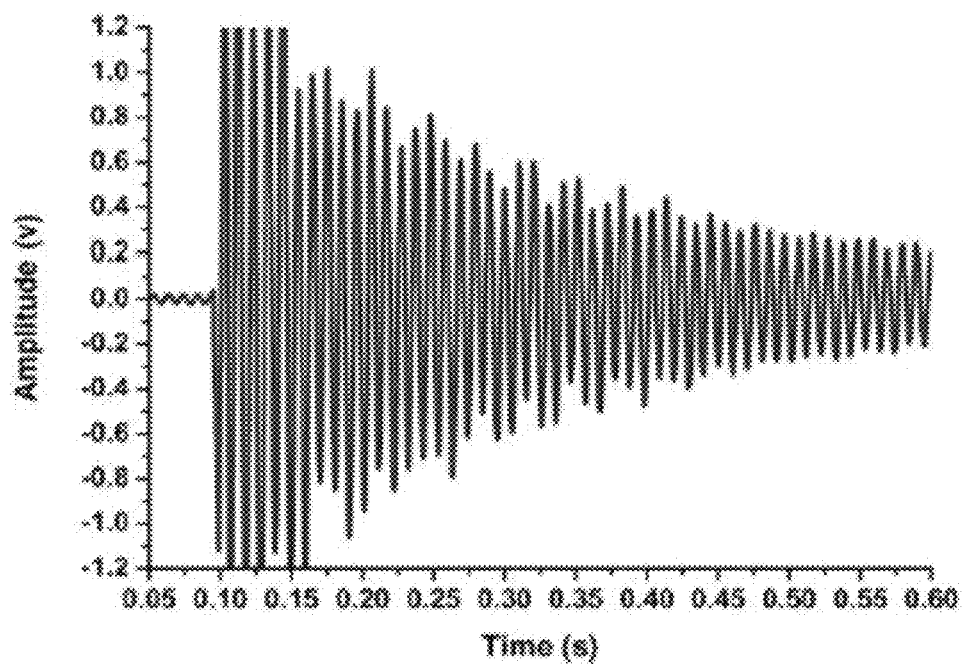
FIG. 4F is a transient response from the free vibration impact test of a sample welded with a rotation speed of 1000 rpm with a welding speed of 110 mm/min.

The time required to dampen the vibration was minimal when compared to other cases (FIG. 4e,f). Therefore, the defective welded joints impede the pulse signal by damping its velocity and amplitude. For defect-free samples, the transmitted signal decays normally and increases the time required to be steady in the transient response domain. Defective welded samples require approximately one-third of the time required by defect-free welds to be damped.

EXAMPLE 5

Effect of Process Parameters on Damping Capacity

Figure 5:
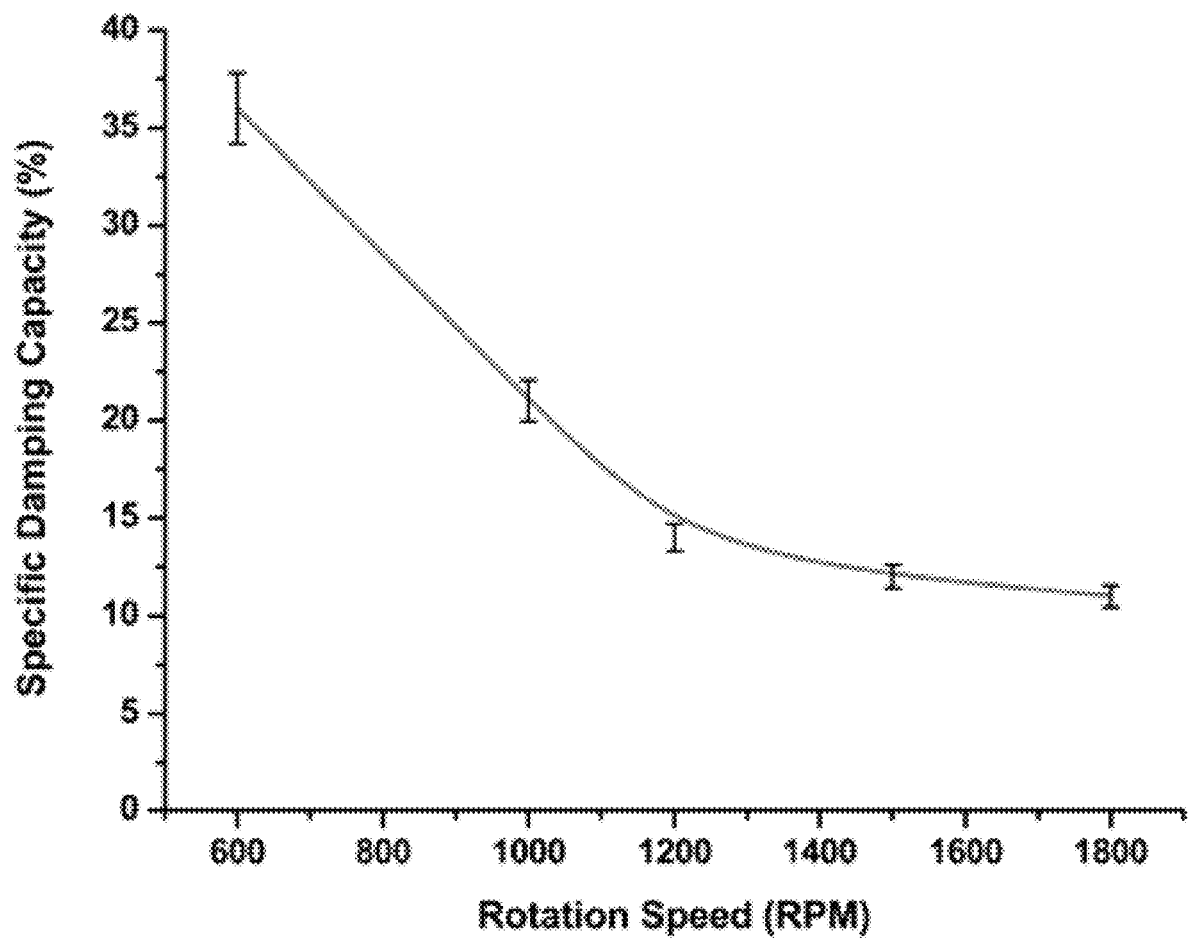
FIG. 5 is a graph illustrating the reciprocal fit of specific damping capacity and tool rotation speed at a constant welding speed of 32 mm/min.

The effect of FSW processing parameters, such as the welding speed rate and tool rotation speed, on the formation of defects was observed using the variance in the damping capacities in the tested welds. The specific damping capacity and the FSW tool rotation speed (ω, rpm) were formulated using the regression analysis in Equation (4). As this represents the regression model, we formulated the relationship between the processing parameters (rotation speed) of friction stir welding and the corresponding damping ratio. At a lower rotation speed, the specific damping capacities have higher values than at high speeds, as shown in FIG. 5.

$$\text{specific damping capacity } (\psi) = \frac{1}{a + (b \times \omega)} \quad (4)$$

Here, a and b are the constants of the regression equation, $a = -0.00767$, $b = 5.89567 \times 10^{-5}$; and ω is the rotation speed in rpm.

Figure 6:
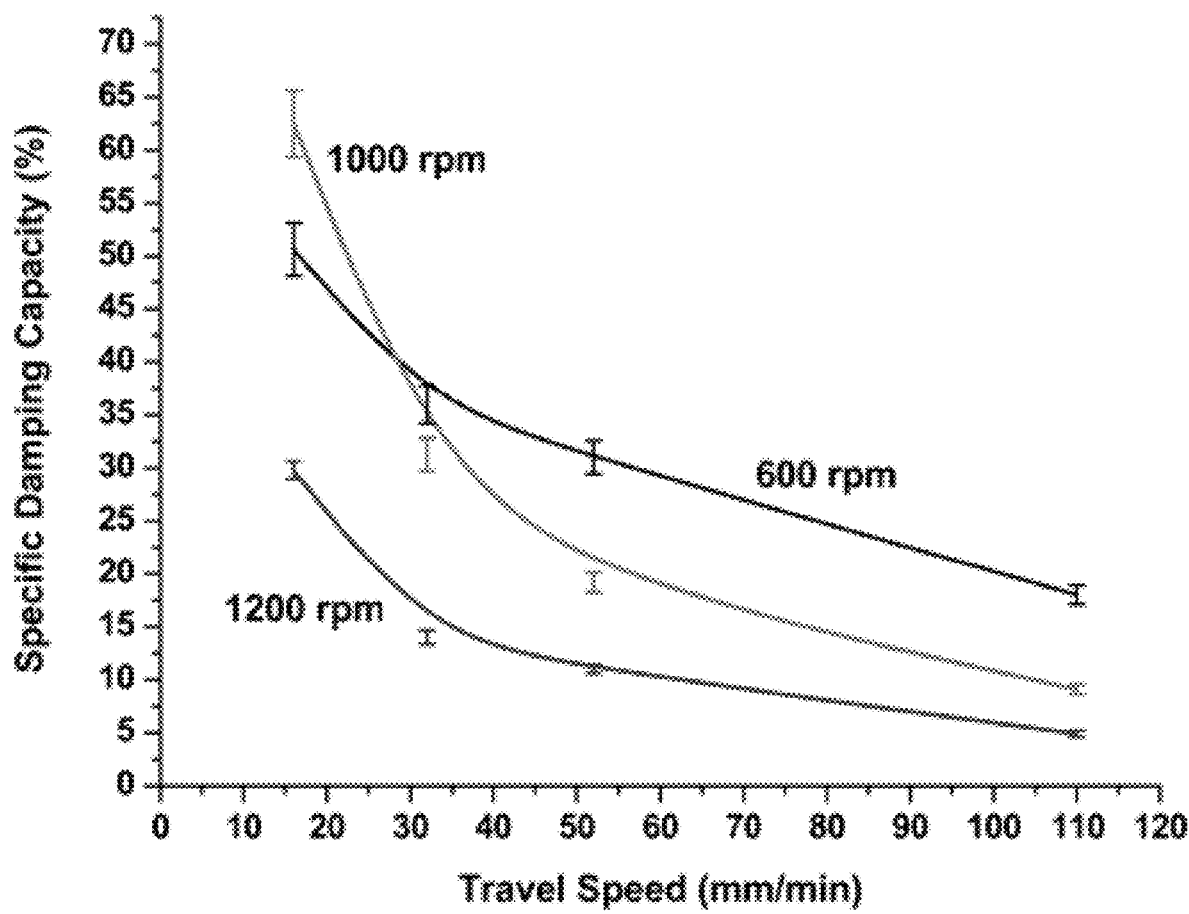
FIG. 6 is a graph showing the effect of welding speed on damping capacity at different rotation speeds.
Figure 7:
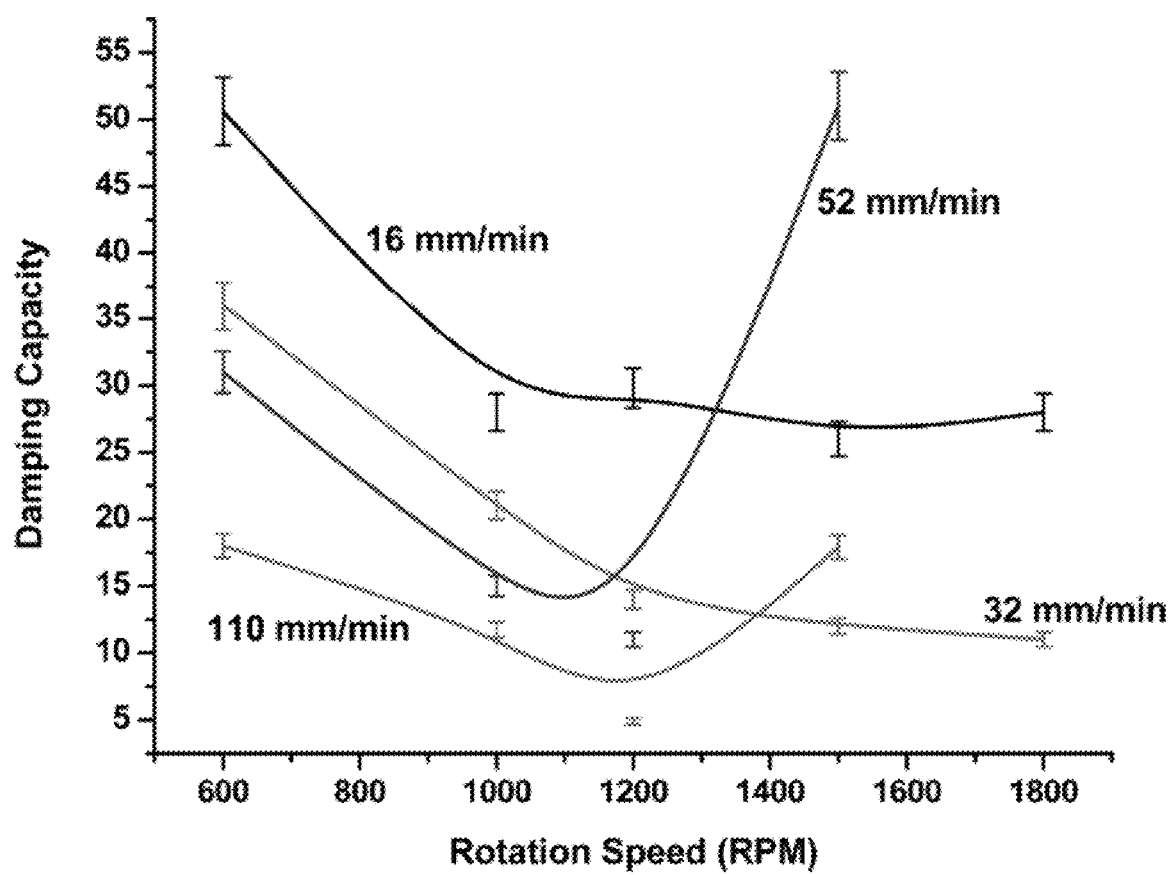
FIG. 7 is a graph illustrating the effect of FSW processing parameters on damping capacity.

In addition to the rotation speed, one of the main processing parameters that affects the friction stir welding process is the traverse speed (welding rate) (v, mm/min). From the experimental results, we observed that whenever the welding rate increased, the heat generated during the friction stirring process decreased. The specific damping capacity decreased nonlinearly with respect to the welding speed, as shown in FIG. 6. From the above, higher tool rotation speeds and the corresponding welding speeds caused an increase in damping capacity values, which were reflected in the quality of the welding process, causing defective welds. However, all welding speeds at low rotation speeds show a significant increase in damping values, as shown in FIG. 7. Higher welding speeds, with a corresponding tool rotation speed of above 1100 rpm, showed a dramatic increase in damping ratio. This can be explained by the fact that a higher rotation speed, when processed at a high welding rate, causes insufficient heat in the stirring zone. Therefore, defects will form during the welding process and, consequently, the damping ratio increases.

Table 2 presents the regression function parameters. Regression Equation (4) was used with minimal error, whereas the error represents the error of regression parameters (a and b), and thus expresses the fitting accuracy of the equation. At lower welding rates with a low tool rotation speed, we observed that the damping capacity increased, indicating that the total mass and the stiffness of the welded joint decreased. The time domain of the tested samples showed significant changes in the decay time for the defective and defect-free samples.

Figure 8:
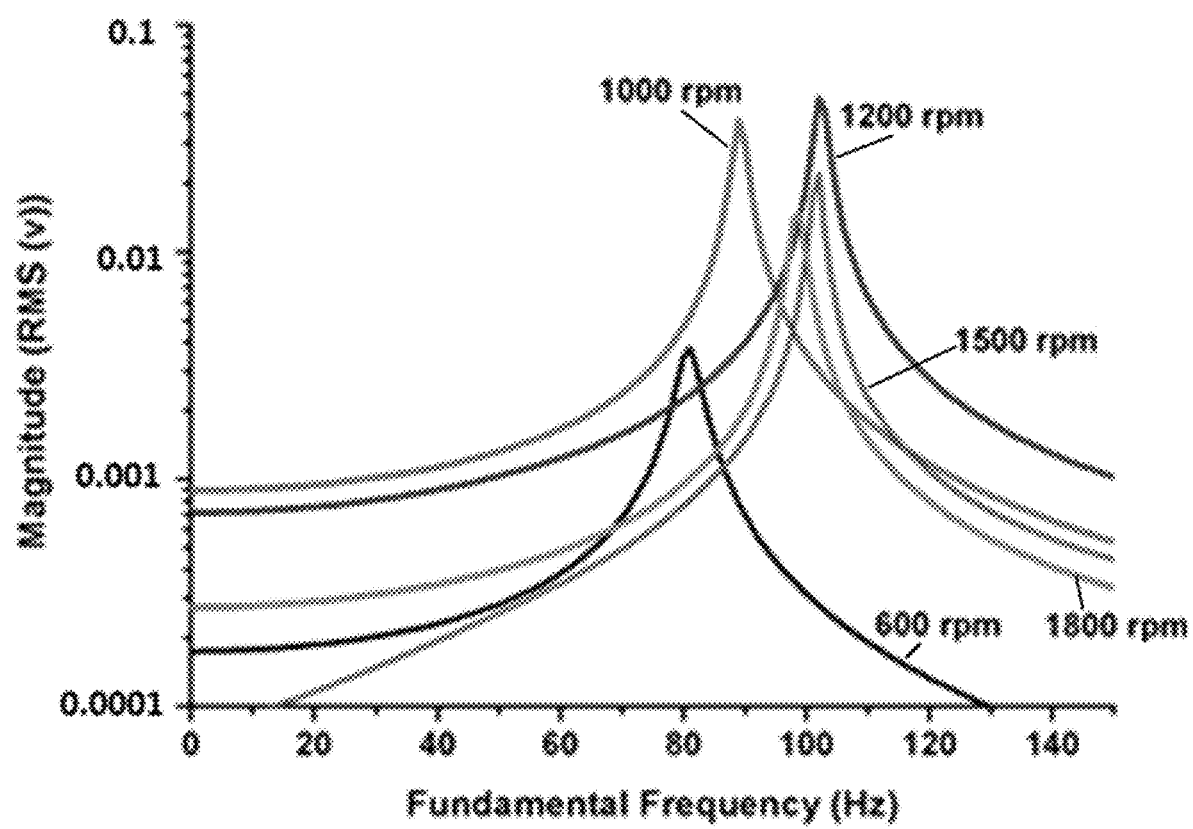
FIG. 8 is a graph illustrating the frequency response function of different rotation speeds at a constant welding speed of 32 mm/min.

The natural frequency was affected by internal defects: as the welded joint stiffness decreased, the natural frequency decreased. The tunnel and generated voids were influenced by the natural frequency of the welded joint, and the internal defects acted as an absorber medium for the acoustic and vibration signals. At higher rotation speeds, we observed an increase in the natural frequency, as shown in FIG. 8. However, the increase in natural frequency was not indicative of weld quality.

EXAMPLE 6

Effect of Pseudo Heat Index ($\omega^2/v$) on Damping Capacity

Figure 9:
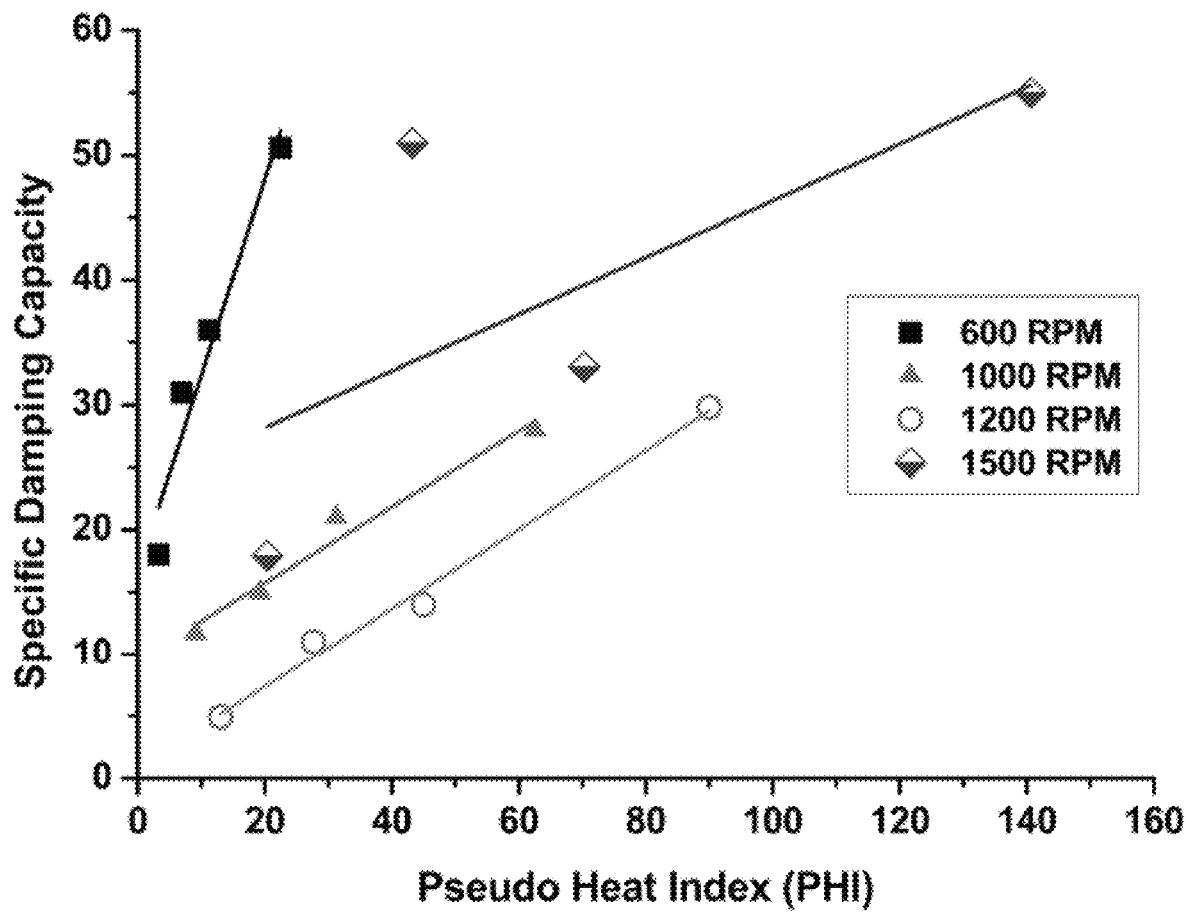
FIG. 9 is a graph illustrating the effect of pseudo heat index (PHI) on damping capacity.

The ratio of the square of the tool rotation speed to linear welding speed is defined as the pseudo heat index (PHI). This method is used to predict the net heat generated during friction stir welding. See Fall, A.; Jahazi, M.; Khdabandeh, A. R.; Fesharaki, M. H. Effect of process parameters on microstructure and mechanical properties of friction stir-welded Ti-6Al-4V joints. *Int. J. Adv. Manuf. Technol.* 2016, 91, 2919-2931, incorporated herein by reference in its entirety. FIG. 9 represents the relationship between the PHI and the specific damping capacity for all rotation speeds and corresponding traverse speeds. It can be seen that any significant increases in the heat index parameter led to increases in the damping capacity. Therefore, it was possible to predict the presence of defects in welding, especially when both parameters increased.

EXAMPLE 7

Effect of Welding Defects on Dynamic Properties

The dynamic modulus was calculated according to ASTM Standard E1875-08, using Equations (5) and (6). See ASTM E1875-08. *Standard Test Method for Dynamic Young's Modulus, Shear Modulus, and Poisson's Ratio by Sonic Resonance;* ASTM International: West Conshohocken, Pa., USA, 2008, incorporated herein by reference in its entirety. Table 3 presents the calculated values that focused on the major defective welded joints, whereas Table 4 presents the defect-free samples. From the calculations, we observed that the dynamic Young's modulus decreased in the presence of defects.

$$E_d = 0.9465\left(\frac{mf^2}{b}\right)\left(\frac{l^3}{t^3}\right)T \qquad (5)$$

where $E_d$ is the dynamic modulus, m is the mass of the bar, b is the width of the bar, L is the length of the bar, t is the thickness of the bar, f is the natural frequency of the bar in flexure, and T is the correction factor for fundamental flexural mode to account for the finite thickness of the bar.

$$T=1.000+6.585\ (t/l) \qquad (6)$$

The dynamic modulus was calculated using experimental results from the vibration analysis and the measurement of the sample mass and volume in order to obtain the density. According to ASTM Standard E1875-08, errors occur in experimental calculations due to measurement errors; therefore, these errors were approximately in the range of ±1.8%. The dynamic properties of the welded joint reflect the quality of the welds through three main factors: natural frequency, damping capacity, and dynamic modulus. The dynamic modulus depends on the natural frequency, mass, and volume of the welded sample. The effect of natural frequency cannot accurately detect defects in welding joints, and this is explained in the next section through the simulation model to predict the natural frequency of defective welds. The second parameter is the mass of the sample, where internal defects decrease the mass. Hence, the defect forms an empty cavity within the metal or welds. When the mass decreases in addition to the slight decrease in the natural frequency, the dynamic modulus also decreases. The experimental results revealed that lower dynamic modulus values were observed at higher damping capacity values.

EXAMPLE 8

Verification Tests —Radiography Scan

Figure 10A:
FIG. 10A is a radiography scan of a weld formed at a rotation speed of 600 rpm with a welding speed of 16 mm/min.
Figure 10B:
FIG. 10B is a radiography scan of a weld formed at a rotation speed of 1500 rpm with a welding speed of 52 mm/min.
Figure 10C:
FIG. 10C is a radiography scan of a weld formed at a rotation speed of 1200 rpm with a welding speed of 52 mm/min.
Figure 10D:
FIG. 10D is a radiography scan of a weld formed at a rotation speed of 1200 rpm with a welding speed of 32 mm/min.
Figure 11A:
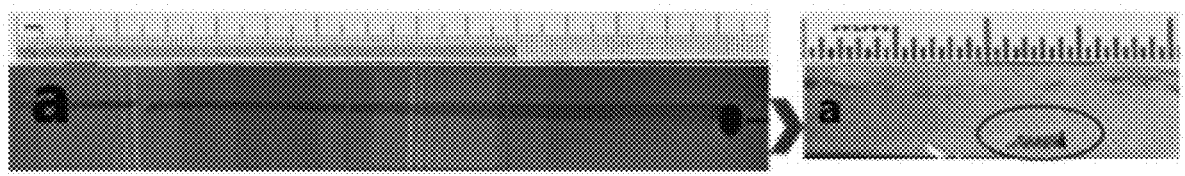
FIG. 11A is a radiography scan with a corresponding macro-scan section of a weld formed at a rotation speed of 600 rpm with a welding speed of 16 mm/min.
Figure 11B:
FIG. 11B is a radiography scan with a corresponding macro-scan section of a weld formed at a rotation speed of 1500 rpm with a welding speed of 52 mm/min.
Figure 11C:
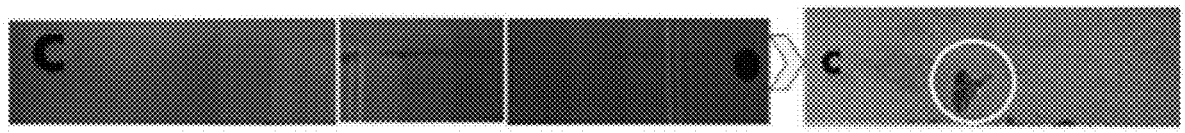
FIG. 11C is a radiography scan with a corresponding macro-scan section of a weld formed at a rotation speed of 1800 rpm with a welding speed of 32 mm/min.
Figure 11D:
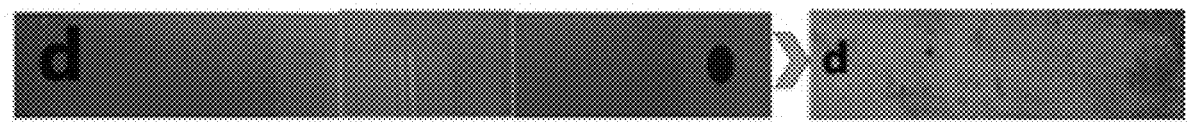
FIG. 11D is a radiography scan with a corresponding macro-scan section of a weld formed at a rotation speed of 1200 rpm with a welding speed of 32 mm/min.
Figure 11E:
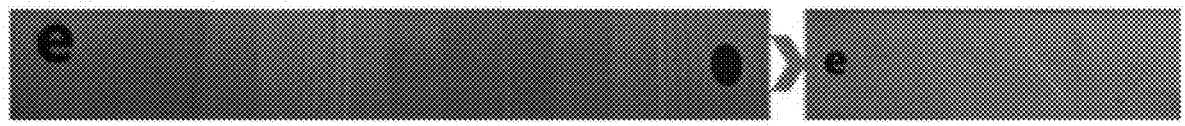
FIG. 11E is a radiography scan with a corresponding macro-scan section of a weld formed at a rotation speed of 1000 rpm with a welding speed of 110 mm/min.

In this test, the welded joints were subjected to a nondestructive radiography scan (YMGI, YXLON, Hudson, N.Y., USA), to inspect the internal defects of all the samples. The test was performed according to E 1032-95, the Standard Test Method for Radiographic Examination of Weldments. The main purpose of this test was to verify the current investigation using a traditional nondestructive test. The radiography scan uses an X-ray beam projected onto the welded joints. The depth of the defect in the direction of the radiation beam was obtained from the density profile of the defect. As shown in FIG. 10, the majority of the defective joints had a tunnel defect, as shown in FIG. 10*a,b*. The results were consistent with the dynamic properties and specific damping capacity. In contrast, the radiography scan did not show any variation in the density profile for defect-free samples, as shown in FIG. 10*c,d*.

Verification Tests—Macrograph Inspection

The welded samples were verified using a destructive sectioning method after determining the position of the cavities and defects in each sample using previous nondestructive radiography scans. FIG. 11 shows the macrography and the section position for each sample. The macrograph was carried out by cutting the welded joint according to the radiograph scan to show the defect profile in each defective sample. The macrograph pictures revealed that most of the defective samples were away from the surface. Furthermore, the defects tended to occur down surface from the FSW joint. The shape of the tunnels and cavities helped to simulate the defects in the next section in the finite element analysis. These shapes were irregular as a result of the processing parameters, tool shape, and material type.

EXAMPLE 9

Finite Element Analysis

Finite element analysis (FEA) was carried out using modal analysis and harmonic response modules. Different models of welding defects were designed in order to simulate the mode shapes of the models and calculate the first natural frequency of each design. The welded joint was modeled as a cantilever beam with the same dimensions as the experimentally tested samples using the free vibration impact test discussed previously. FIG. 12 shows the different designs of defects based on the most common defect results in the friction stir welding process.

The defect shape was modeled to the nearest regular form for analysis purposes. Hence, the difference between the regular shape and the actual irregular shape (from the macrograph) was very close in the final results. The simulation process involved two steps: loading the modal analysis; and designing suitable parameters to calculate the natural frequency. The meshing type and sizing were adjusted based on tetrahedron methods in order to perform the simulation with minimal error. Furthermore, boundary conditions were applied to the end of a cantilever beam as a fixed support, and the force was provided at the tip of the beam. The second step (harmonic response) was conducted as a simulation process in order to predict the frequency response function (FRF).

Figure 13:
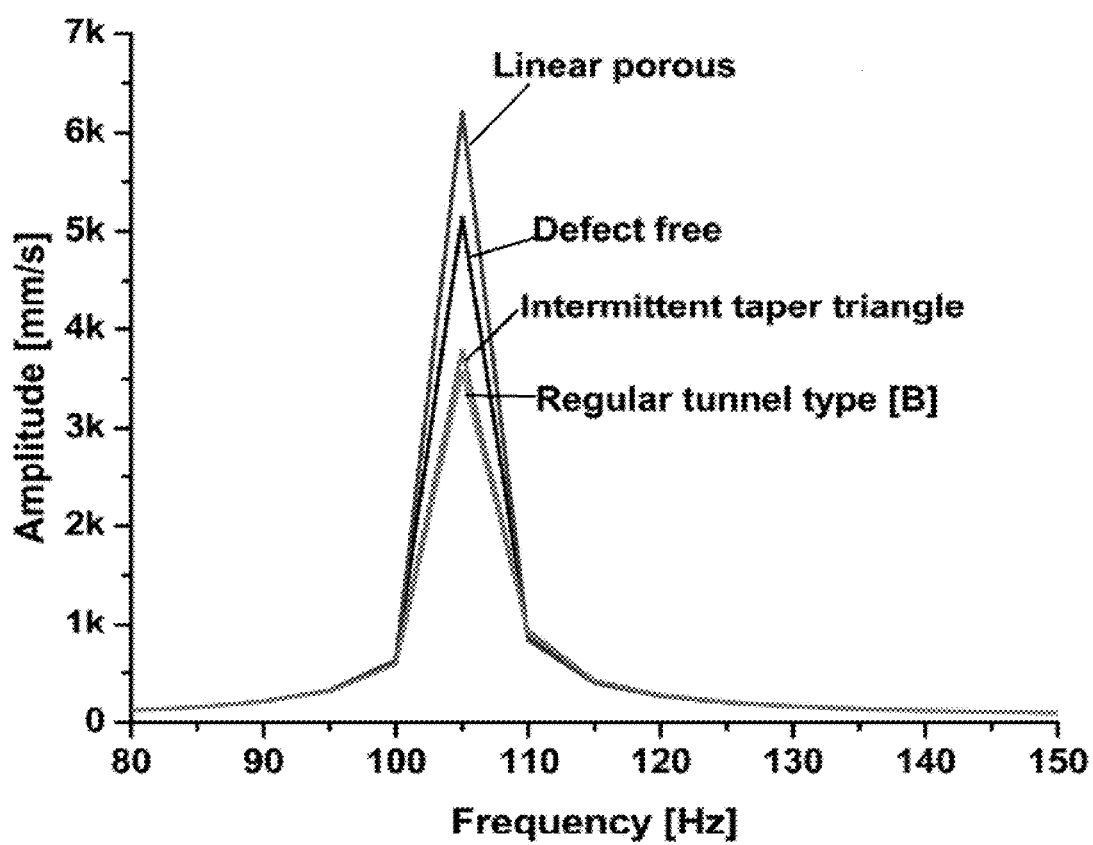
FIG. 13 is a graph illustrating the frequency response function (FRF) simulation of small defects.
Figure 14:
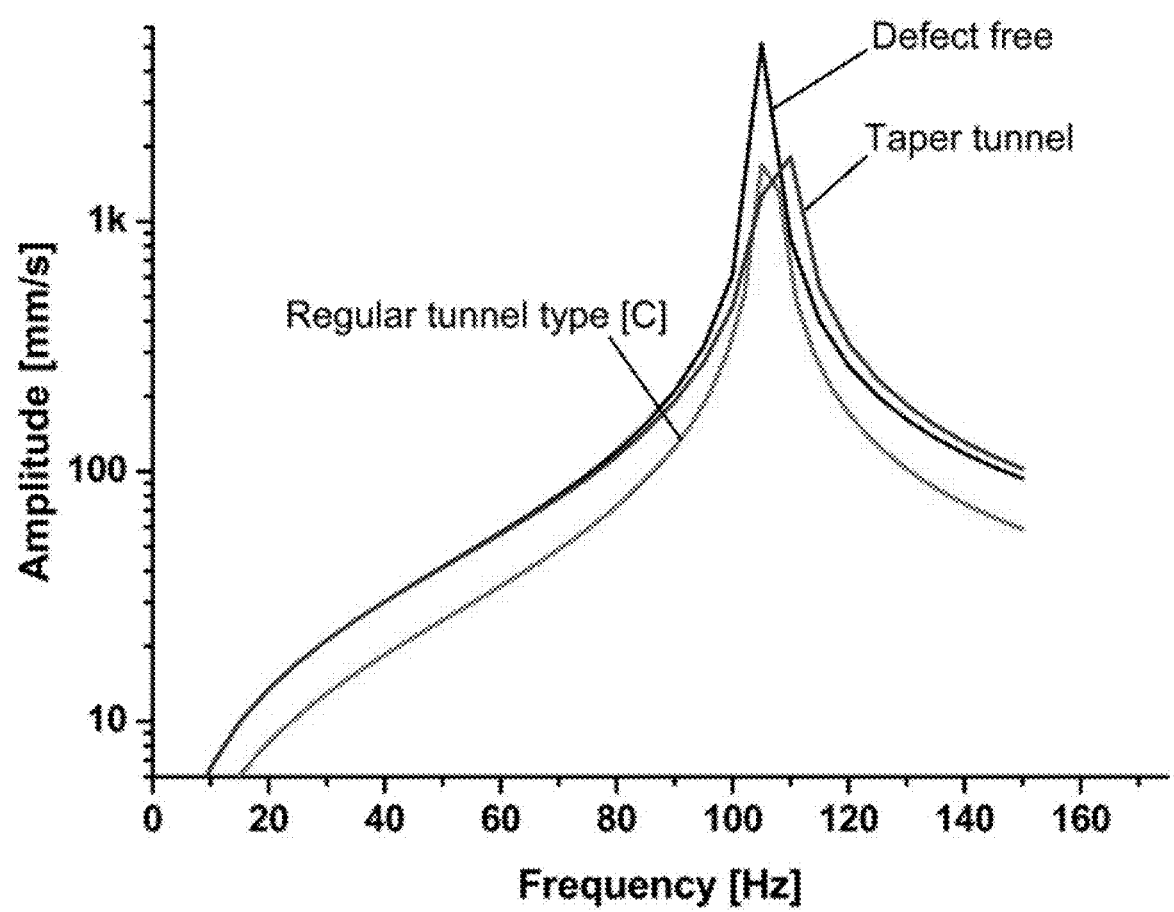
FIG. 14 is a graph illustrating the FRF simulation of large tunnel defects.

All the calculations and essential data were collected based on the previous processing step. The frequency range was adjusted to 0 to 150 Hz according to the natural frequency calculation in the first step. Six models were built and simulated using finite element software (ANSYS, ANSYS Inc, Canonsburg, Pa., USA). In the present investigation there are six types of welding defect that have been simulated using finite element analysis software. Each model represented a welded joint under certain defects, except the first one, which was defect-free. The models simulate some of the common experimental defects generated during welding process. The models were designed to form defects varying from the smallest to the largest in size. Linear porous defect in section A-A represents the smaller defect. The other models represent: regular tunnel type section B-B, regular tunnel type section C-C, taper rectangle tunnel section E-E, and intermittent taper triangle tunnel section F-F. Table 5 presents the results of the simulation of different designs of defects. The results revealed that the values of the natural frequency of the welded joint were very close, whether defective or not, because the size of the defect does not significantly affect the mass, which impacts the natural frequency. Close natural values were observed in small defects with the defect-free sample. Small defects, such as pores and small cracks, cannot be detected through the natural frequency of a metal because the variation in frequency is limited, as shown in FIG. 13. Those defects significantly affected the welded structure. In the case of noticeable defects, the natural frequency can detect these defects, although the values of the defective sample frequencies converge with those of the defect-free sample, as shown in FIG. 14. Table 6 presents a comparison of the results between the experimental and simulated natural frequency for the defect-free samples and for significant defects. The simulated results show that the natural frequency increases slightly with small detects, contrary to the experimental results, where the natural frequency tends to decrease as the defects increase.

The shape of a defect affects the stiffness of the welded joints. When the sample mass decreases, the natural frequency does not decrease at the same rate. From the previous figures, natural frequency is not a factor that can be used to detect welding defects. The results of the finite element analysis were consistent with the experimental vibration test, from which the dynamic properties could be deduced.

From previous results, it was concluded that the FSW processing parameters affect the dynamic properties of the welded joint, according to the heat generated due to the stirring action and different processing conditions. The processing parameters that influence the dynamic characteristics are natural frequency, damping capacity, and dynamic modulus.

Specific damping capacity decreased nonlinearly with increases in the tool rotation speed and welding rate. This parameter expresses the welding quality because the damping capacity depends on the internal friction of the material. Consequently, specific damping capacity is an excellent parameter to detect welding defects.

The corresponding natural frequencies of the defective welding samples increased slightly with respect to the defect-free weld. Therefore, the experimental results of the FRF agree with the numerical method using the FEM results to show that the natural frequency of the defective joint has no significant effect on the detection of internal defects, especially if these defects are small.

The demand for nondestructive testing has increased, especially in welding testing. As described above, AA1060 aluminum plates were jointed using the friction stir welding (FSW) process. The fabricated joints were subjected to free vibration impact testing in order to investigate the dynamic properties of the welded joint. Damping capacity and dynamic modulus were used in the new prediction method to detect FSW defects. The data acquired were processed and analyzed using a dynamic pulse analyzer lab shop and ME' Scope's post-processing software, respectively. A finite element analysis using ANSYS software was conducted on different types of designed defects to predict the natural frequency. The results revealed that defects in welded joints significantly affect the specific damping capacity. As the damping ratio increased, so did the indication of opportunities to increase the presence of defects. The finite element simulation model was consistent with experimental work. It was therefore revealed that natural frequency was insufficient to predict smaller defects.

TABLE 1

Chemical composition of AA1060 (wt. %).

| Alloy | Si | Fe | Cu | Mn | Mg | V | others | Al |
|---|---|---|---|---|---|---|---|---|
| 1060 | 0.25 | 0.4 | 0.05 | 0.05 | 0.05 | 0.05 | 0.03 | remain |

TABLE 2

Parameters of the reciprocal function.

| Tool Speed ($\omega$) | a | Error | b | Error |
|---|---|---|---|---|
| 600 | 0.01392 | 0.00124 | $3.83432 \times 10^{-4}$ | $4.47684 \times 10^{-5}$ |
| 1200 | 0.00258 | 0.00495 | 0.00195 | $2.6868 \times 10^{-4}$ |
| 1500 | 0.02993 | 0.02455 | $5.54028 \times 10^{-5}$ | $4.45066 \times 10^{-4}$ |

TABLE 3

The dynamic properties of defective welds.

| Welding Speed (mm/min) | Rotation Speed (rpm) | PHI ($\omega^2/v \times$ 1000) (%) | Natural Frequency (Hz) | Dynamic Young's Modulus (GPa) | Specific Damping Capacity | Calculation Error (%) |
|---|---|---|---|---|---|---|
| 16 | 600 | 22.5 | 78 | 51.8 | 50.6 | ±1.8 |
| 16 | 1500 | 3.3 | 87.8 | 53.2 | 55 | ±1.8 |
| 52 | 1500 | 43.3 | 87 | 58.3 | 51 | ±1.8 |

TABLE 4

The dynamic properties of the defect-free welds.

| Welding Speed (mm/min) | Rotation Speed (rpm) | PHI ($\omega^2/v$ × 1000) (%) | Natural Frequency (Hz) | Dynamic Young's Modulus (GPa) | Specific Damping Capacity | Calculation Error (%) |
|---|---|---|---|---|---|---|
| 110 | 1000 | 9.09 | 103 | 73.1 | 11.7 | ±1.8 |
| 32 | 1200 | 45 | 102 | 74.5 | 14 | ±1.8 |
| 52 | 1200 | 27.7 | 96 | 70.9 | 11 | ±1.8 |

TABLE 5

Investigated defect types and properties with corresponding frequencies.

| Defect shape | Sample Mass (g) | Percentage of Mass Loss (%) | Natural Frequency (Hz) |
|---|---|---|---|
| Defect-free | 35.02 | 0 | 105.69 |
| Linear pattern porous defect | 34.96 | 0.17 | 105.58 |
| Regular tunnel type B | 33.65 | 3.91 | 106.02 |
| Regular tunnel type C | 32.82 | 6.28 | 106.31 |
| Taper rectangle tunnel | 33.18 | 5.25 | 107.92 |
| Intermittent taper triangle tunnel | 34.59 | 1.23 | 105.95 |

TABLE 6

Comparison between experimental and simulated frequency results.

| Defect Type | Experimental $F_n$ | Simulated $F_n$ |
|---|---|---|
| Defect-free | 103 | 105.69 |
| Linear pattern porous defect | — | 105.58 |
| Regular tunnel type B | 87 | 106.02 |

The invention claimed is:

1. Inspection method for quality determination of a welded aluminum plate, comprising:
    friction stir welding first and second aluminum specimens with a carbon-chrome steel tool at a welding speed of from 16 to 110 mm/min to form the welded aluminum plate;
    generating a vibration in the welded aluminum plate and a geometrically-equivalent defect-free aluminum plate by impacting the welded aluminum plate and the geometrically-equivalent defect-free aluminum plate with a hammer;
    measuring a sample specific damping capacity of the vibration of the welded aluminum plate with an accelerometer;
    measuring a reference specific damping capacity of the geometrically-equivalent defect-free aluminum plate with the accelerometer;
    comparing the sample specific damping capacity to the reference specific damping capacity; and
    determining the quality of a welded seam of the welded aluminum plate by the comparing the sample specific damping capacity of the welded aluminum plate and the reference specific damping capacity of the geometrically-equivalent defect-free aluminum plate,
    wherein the welded aluminum plate and the geometrically-equivalent defect-free aluminum plate each comprise at least 95 wt % aluminum relative to a respective total weight.

2. The method of claim 1, which does not compare the natural frequency of the welded plate with the geometrically-equivalent defect-free aluminum plate.

3. The method of claim 1, wherein the geometrically-equivalent defect-free aluminum plate is not welded.

4. The method of claim 1, wherein the geometrically-equivalent defect-free aluminum plate is welded.

5. The method of claim 4, wherein the geometrically-equivalent defect-free aluminum plate is friction stir welded.

6. The method of claim 1, wherein based on a determined uniformity of the welded seam, the method further comprises
    welding a second aluminum plate with at least one welding parameter that differs from welding parameters used to weld the welded aluminum plate when the welded seam is determined to be non-uniform.

7. The method of claim 1, wherein the welded seam is considered defective when the specific damping capacity is 30 or greater.

8. The method of claim 1, wherein a natural vibration frequency of the welded aluminum plate and of the geometrically-equivalent defect-free aluminum plate each differ by no more than 10%.

9. The method of claim 1, wherein a natural vibration frequency of the welded aluminum plate and of the geometrically-equivalent defect-free aluminum plate each differ by no more than 5%.

10. The method of claim 1, wherein a mass of the welded aluminum plate and of the geometrically-equivalent defect-free aluminum plate each differ by no more than 0.50%.

* * * * *